United States Patent [19]

Wolters

[11] 4,374,420
[45] Feb. 15, 1983

[54] METHOD OF ACCURATELY DREDGING A DESIRED PROFILE CONTOUR

[75] Inventor: Tjako A. Wolters, Zeist, Netherlands

[73] Assignee: Ballast-Nedam Groep N.V., Amstelveen, Netherlands

[21] Appl. No.: 144,650

[22] Filed: Apr. 28, 1980

[30] Foreign Application Priority Data

May 14, 1980 [NL] Netherlands .......................... 7903782

[51] Int. Cl.³ .......................... G05D 1/10; E02F 3/18
[52] U.S. Cl. ........................................ 364/424; 37/67; 37/DIG. 1
[58] Field of Search ................... 364/424; 37/54, 58, 37/67, 73, DIG. 1

[56] References Cited

U.S. PATENT DOCUMENTS

| | | | |
|---|---|---|---|
| 3,919,791 | 11/1975 | Smith | 37/67 |
| 4,084,334 | 4/1978 | Wolters et al. | 37/67 |
| 4,133,033 | 1/1979 | Noordermeer et al. | 364/424 |
| 4,149,251 | 4/1979 | Noordermeer et al. | 364/424 |
| 4,156,317 | 5/1979 | Schmidt | 37/54 |
| 4,177,585 | 12/1979 | De Koning et al. | 37/67 |
| 4,242,815 | 1/1981 | Vermeulen | 37/58 |

FOREIGN PATENT DOCUMENTS

| | | | |
|---|---|---|---|
| 6706196 | 11/1968 | Netherlands | 37/58 |
| 6803487 | 9/1969 | Netherlands | 37/67 |

*Primary Examiner*—Felix D. Gruber
*Attorney, Agent, or Firm*—Diller, Ramik & Wight

[57] ABSTRACT

The method of dredging accurately to a desired profile contour with a cutting dredger involves the operation of a cutting assembly, the cutting tools of which describe a predetermined cutting envelope, and swinging the cutting assembly while the dredger is anchored at a known point. The known point is established by means of land-based radio beacons and an aerial aboard the dredger, the dredger being anchored at the known point while the longitudinal axis of the dredger is aligned or substantially aligned with the longitudinal axis of the desired profile contour. As the dredger is swung with the cutting tools engaging the material to be dredged, the location of geometric points of the dredger assembly are repetitively calculated with respect to the coordinate system of the desired profile contour, taking into account various angular relationships between and among such points and by also taking into account motions of the dredger as affected by wave and/or tide actions. The swinging is terminated when the cutting point on the predetermined cutting envelope closely approaches the desired profile contour.

7 Claims, 126 Drawing Figures

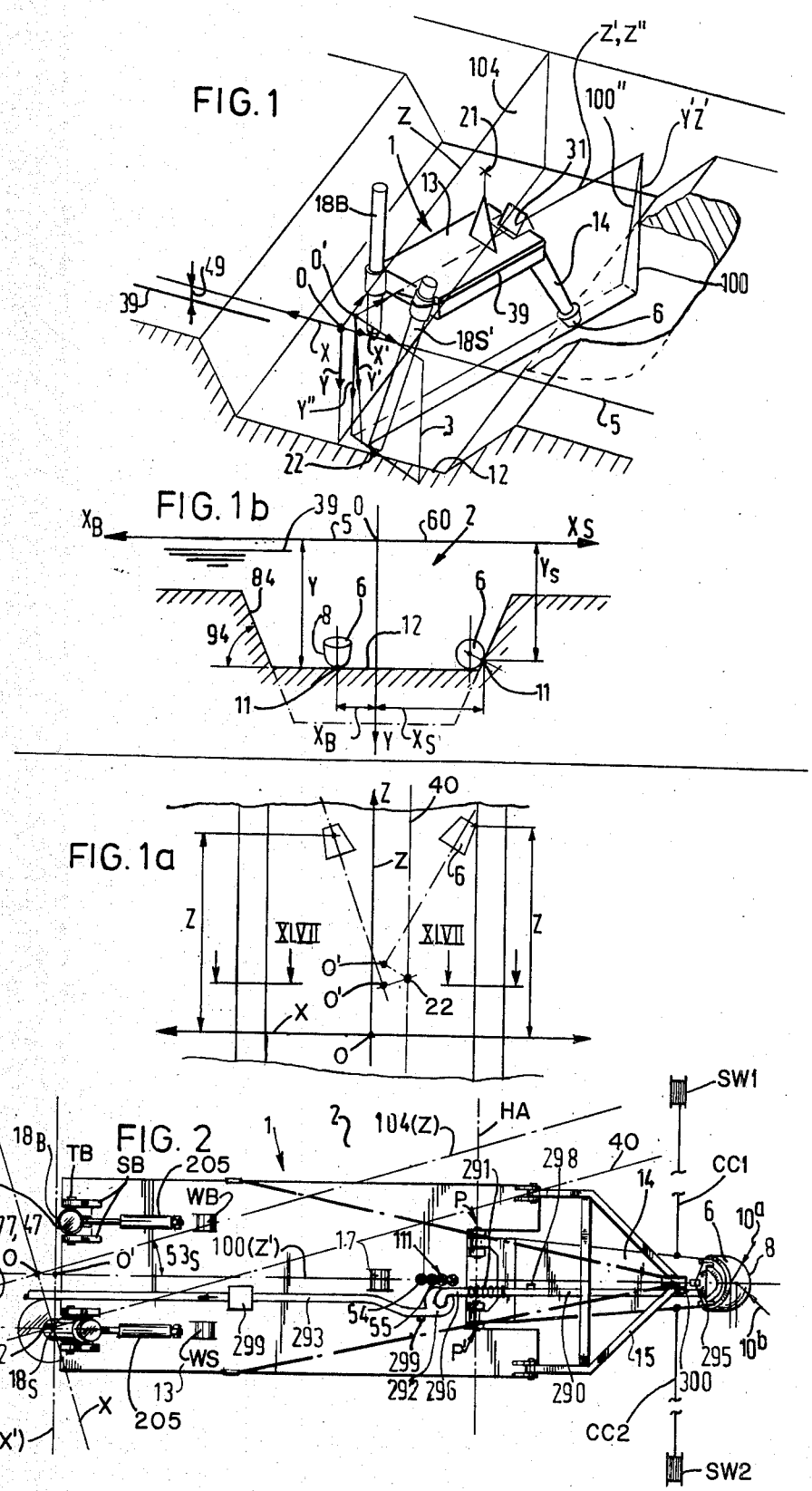

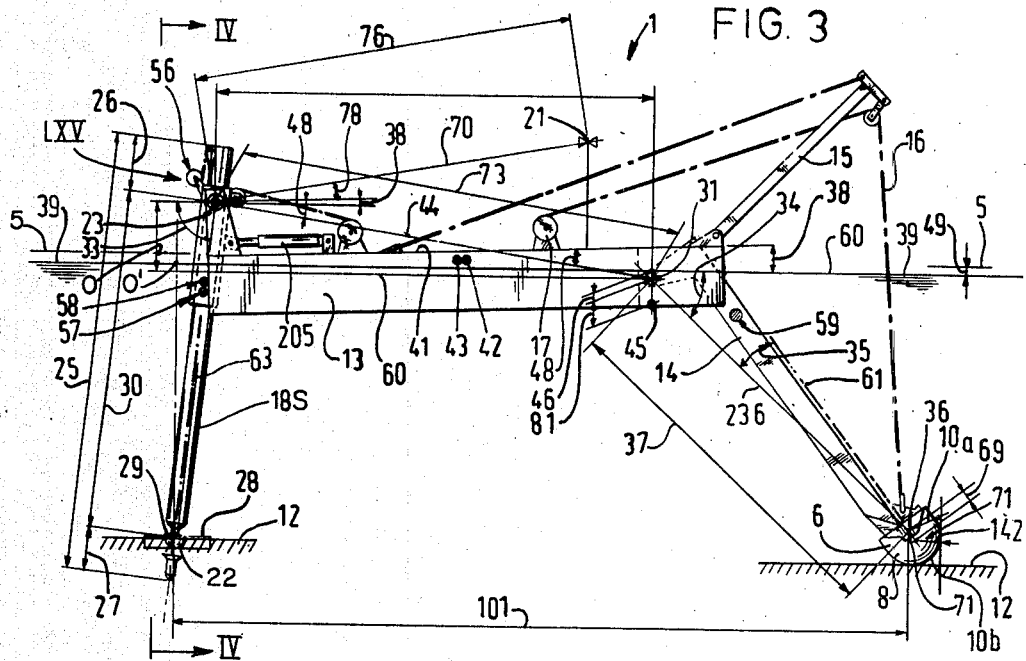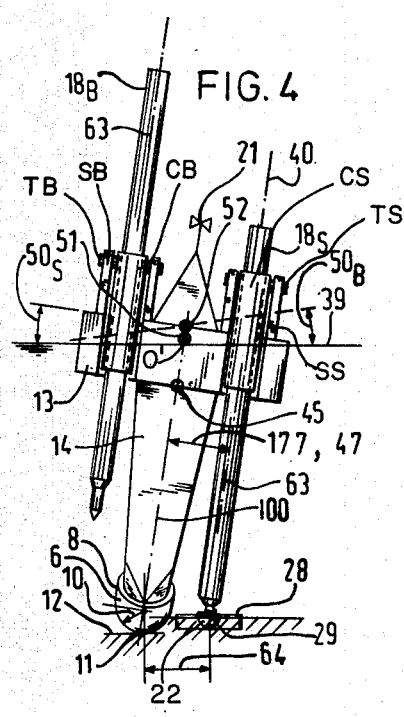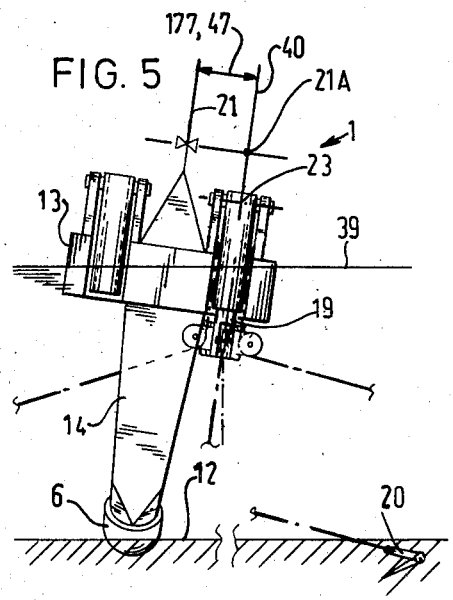

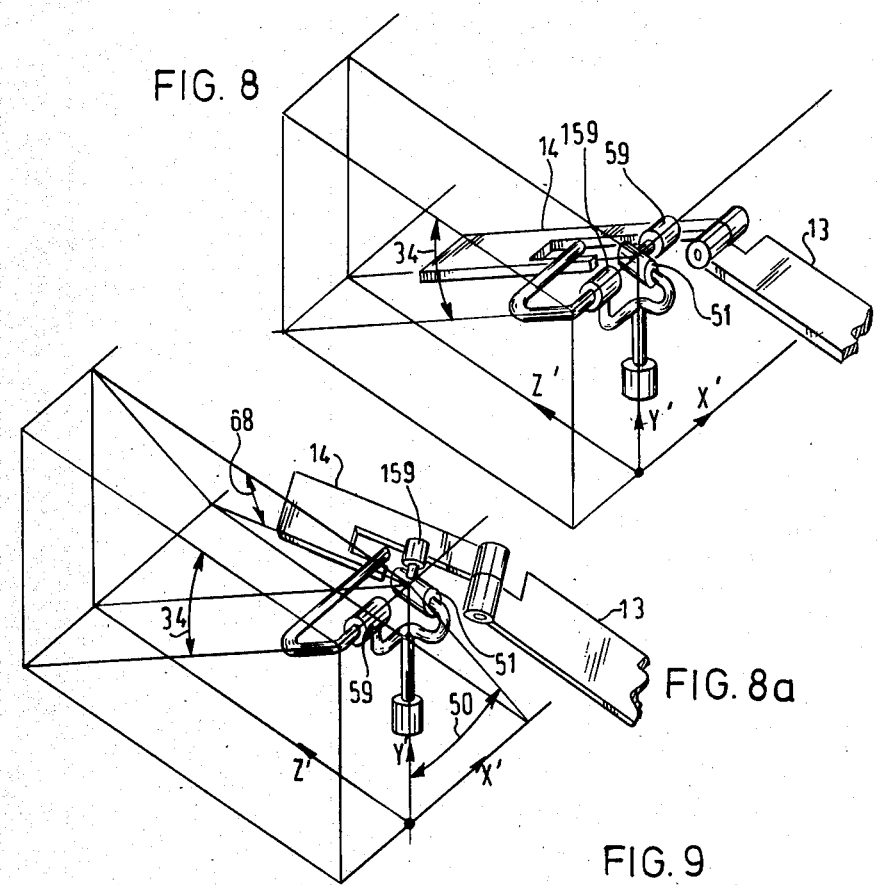
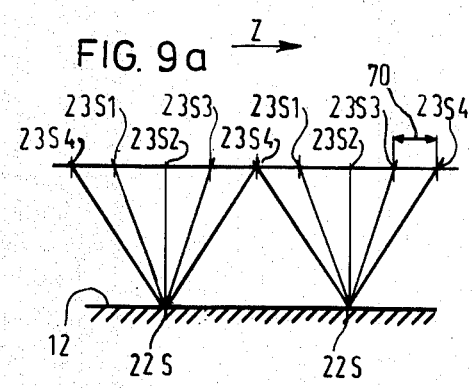
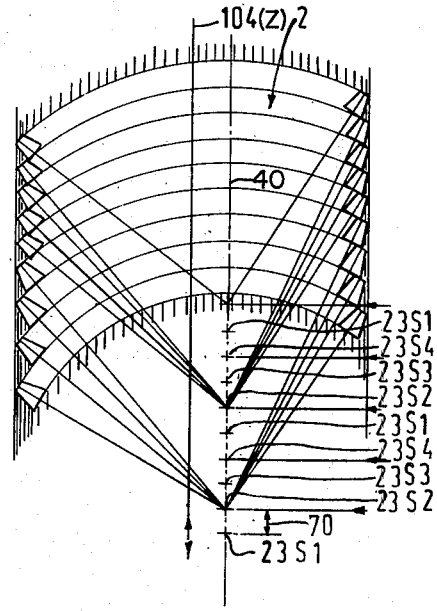

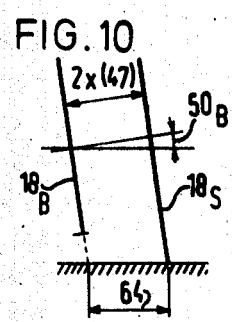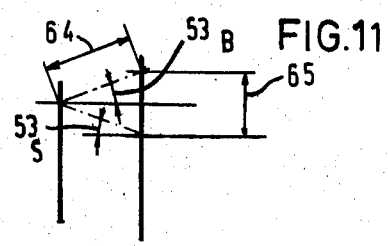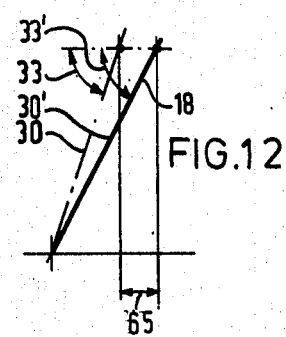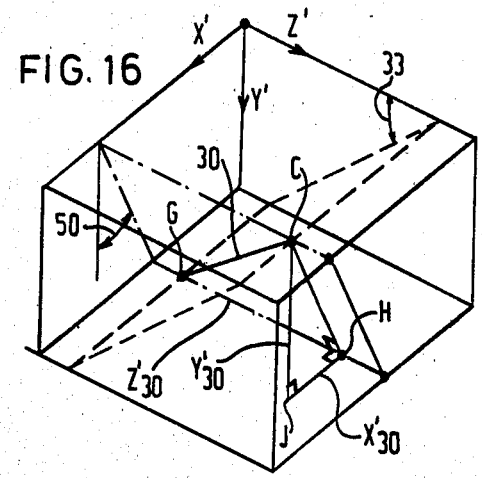

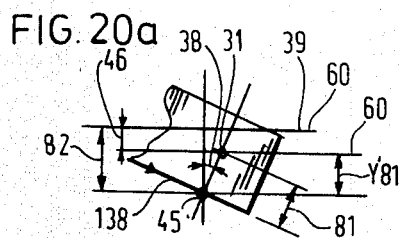
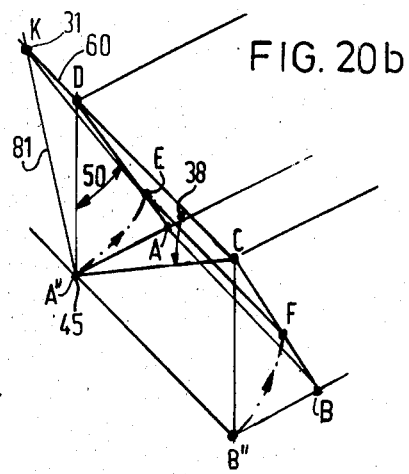
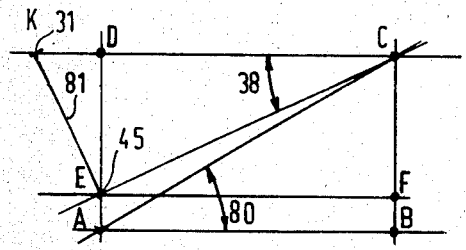
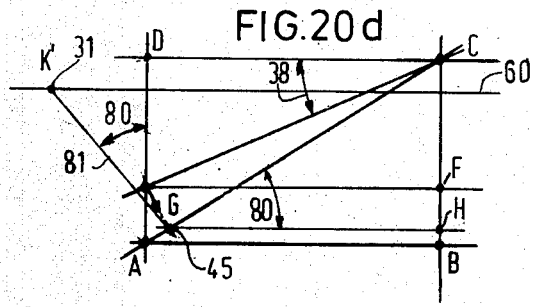
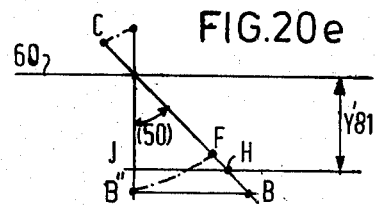
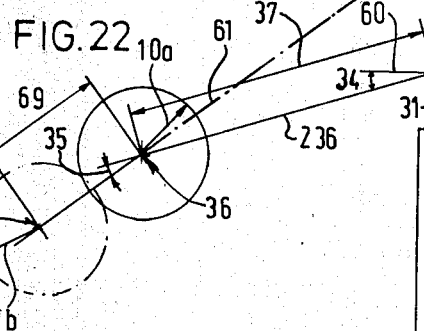
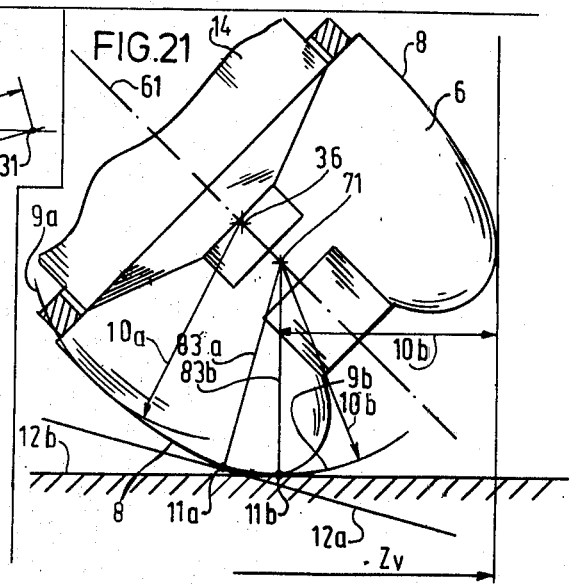

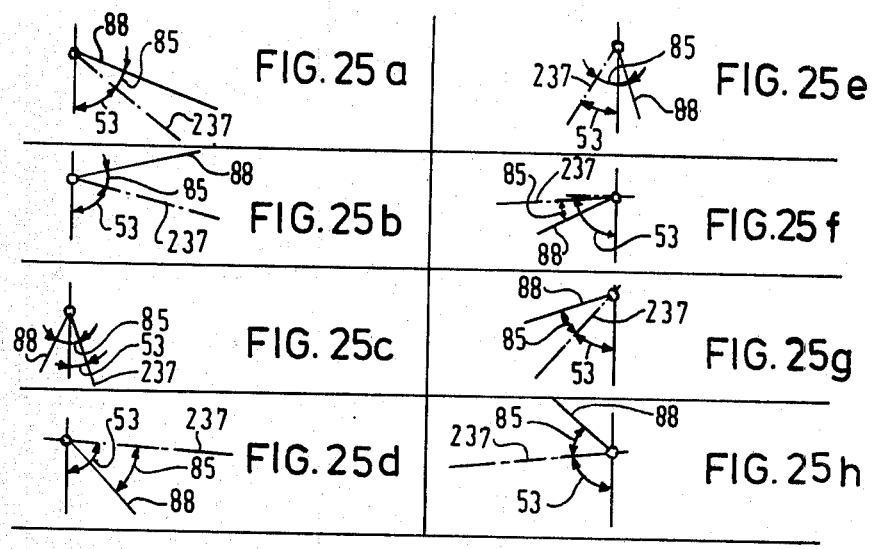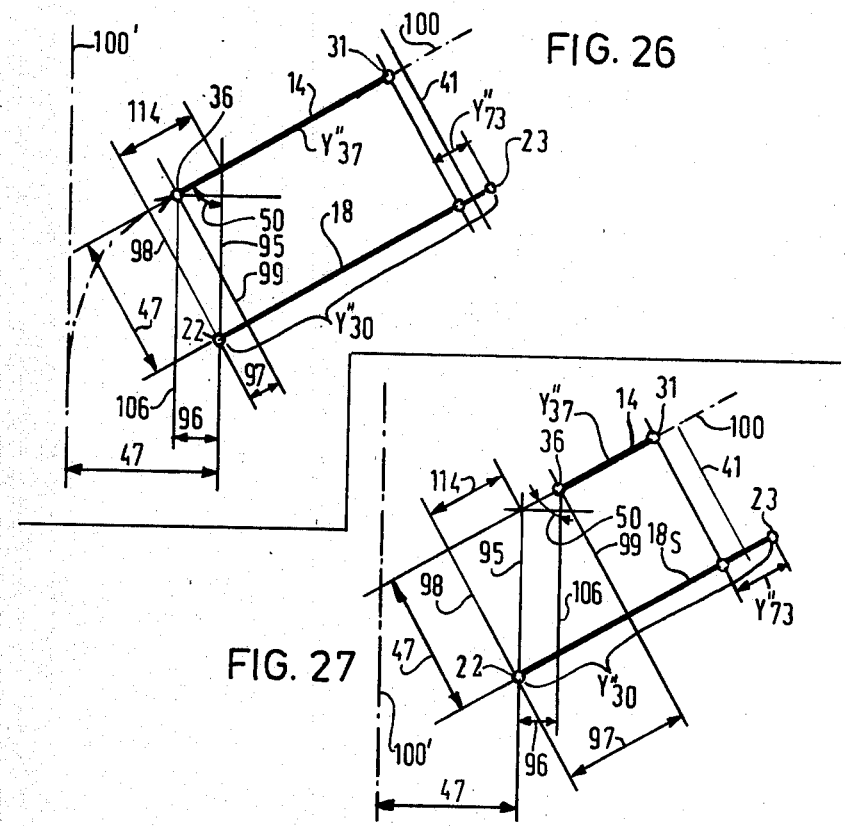

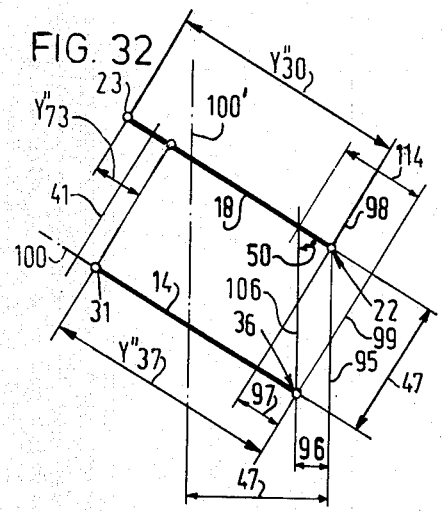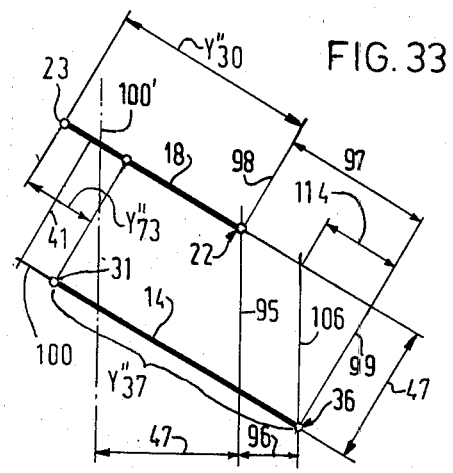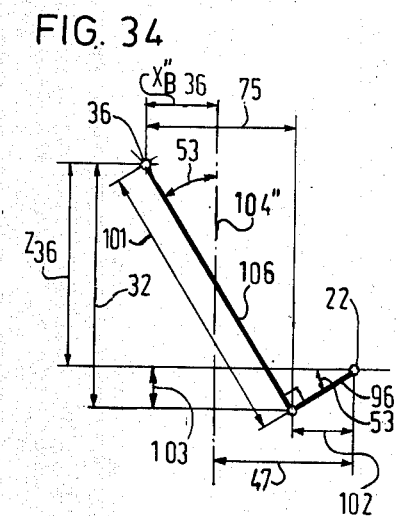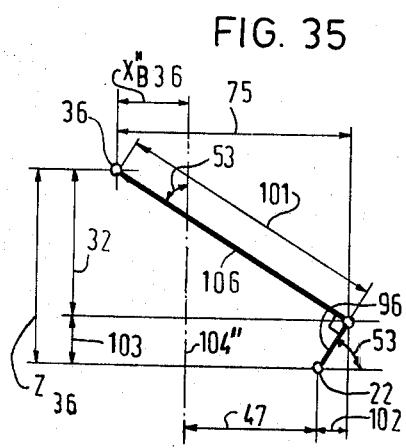

FIG. 36
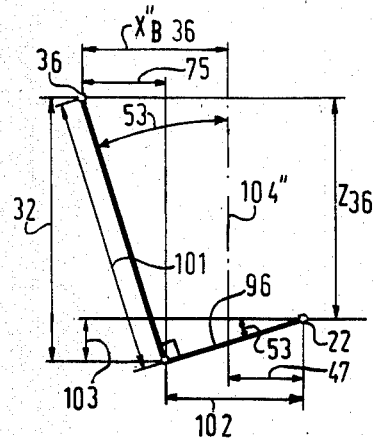
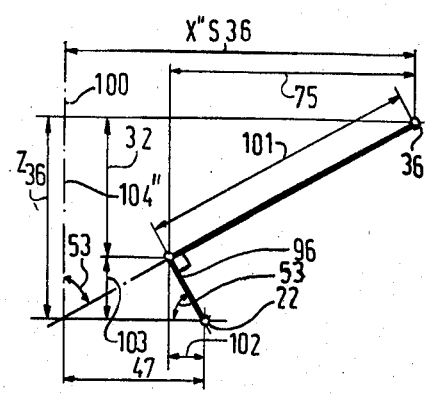
FIG. 38
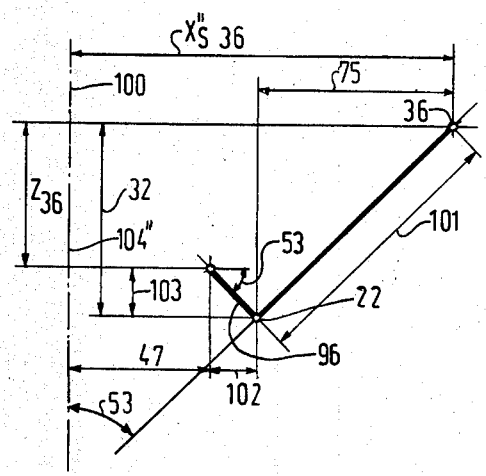
FIG. 39
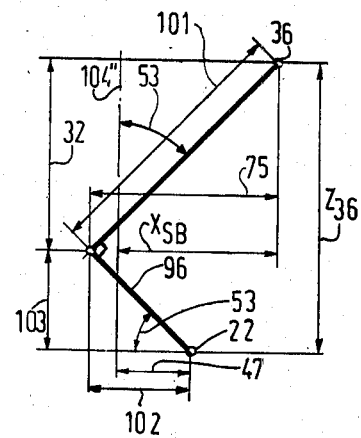

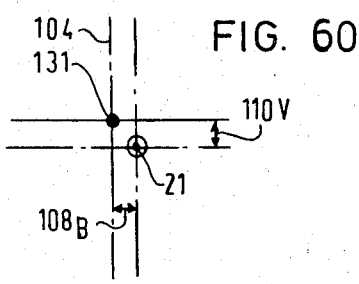
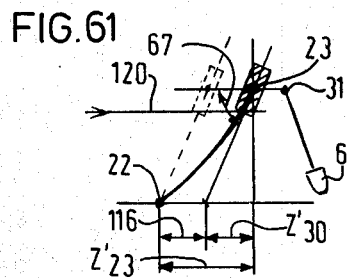
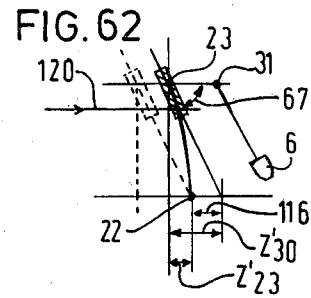
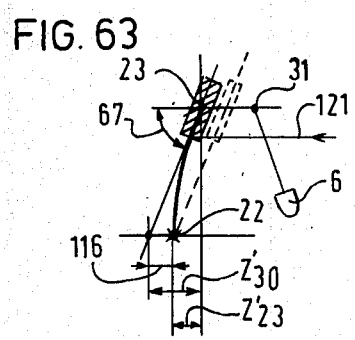
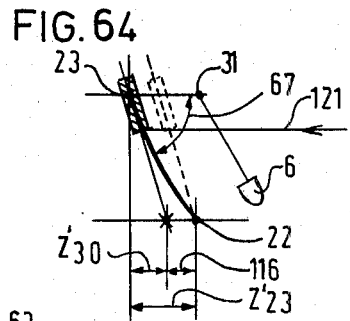
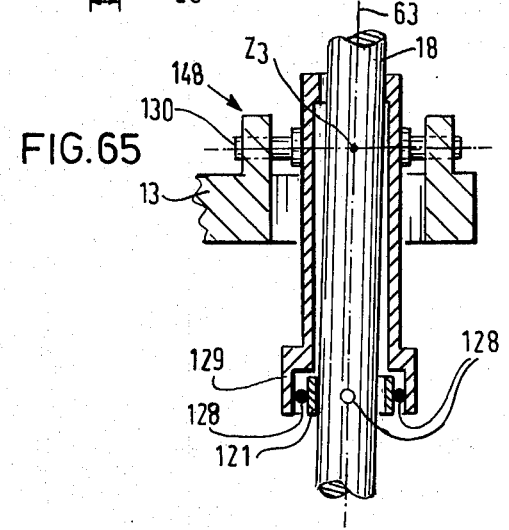

METHOD OF ACCURATELY DREDGING A DESIRED PROFILE CONTOUR

The invention relates to a method of dredging with the aid of a dredger implement comprising at least one ground cutting member, in which the position of the cutting member with respect to a co-ordinate system is steered.

Such a method is known. In the known method the dredger implement cannot be accurately steered since the path to be covered by a fixed point of the dredger implement is chosen as a starting point. The resulting dredging work is, therefore, inaccurate.

The invention provides a method in which the dredger implement is more accurately steered, because during a given movement of the cutting member the tangential point of at least one cutting envelope of the cutting member to a plane parallel to the prescribed profile to be encountered is assessed, because the radius of the cutting envelope directed to the tangential point is projected onto at least one co-ordinate of the co-ordinate system, onto which is also projected the path to be covered by the centre of the cutting envelope and because in the calculation of the path still to be covered by the centre the projection of said radius is taken into account.

Preferably the cutting envelope of the cutting member is simulated by at least two spherical cutting bodies, each of which has its own centre whilst during a given movement of the cutting member the tangential point of each cutting body to a plane parallel to the prescribed profile to be encountered is assessed, for each cutting body the path still to be covered by its centre taken into account in the projection of the associated radius is assessed and the given movement is continued until at least one of the cutting bodies attains its limit.

The invention relates to and provides furthermore a dredger implement comprising a floating body, a ladder movably connected with the floating body, at least one cutting member carried by the ladder and controllable displacing means for displacing the cutting member along a trajectory which dredger implement is characterized by measuring and arithmetic means for assessing, during a given movement of the cutting member, the tangential point of at least one cutting envelope of the cutting member to a plane parallel to the prescribed profile to be encountered, by measuring and arithmetic means for assessing the projection of the radius of the cutting envelope directed to said tangential point onto at least one co-ordinate of the co-ordinate system, onto which is also projected the path to be covered by the centre of the cutting envelope and by arithmetic means for taking into account the projection of said radius in the calculation of the path still to be covered by the centre.

The invention relates furthermore to a method of steering a dredger implement comprising a ground working tool, in which the position of a starting point of the dredger implement with respect to a work co-ordinate system is determined and in which the relative position of the tool with respect to the starting point is calculated by calculating each time the projections of the length of each one of a plurality of parts of the dredger implement extending in series between the tool and the starting point onto a co-ordinate system of the implement as a function of at least one angle measured in a plane parallel to an axis of the implement co-ordinate system and included between the longitudinal direction of said part and a plane parallel to an axis of the implement co-ordinate system and by algebraically summing the calculated projections of the same nature in the implement co-ordinate system and in which the position of the tool with respect to the work co-ordinate system is assessed by rotating the relative position of the tool with respect to the starting point from the implement co-ordinate system into the work co-ordinate system.

Such a method is known from Dutch patent application 6706196, laid open for public inspection. Herein the projections of the lengths of two sequential suction pipe sections pivotable with respect to one another and to the vessel onto an implement co-ordinate system are calculated, the lengths of the suction pipe sections being projected onto the vertical, longitudinal median plane of the implement. By this known method the dredger implement is inaccurately steered, for example, due to longitudinal and/or transverse trim of the dredger vessel which disturb the measurement of the position of the tool.

The invention provides a more accurate method, characterized in that each time the projections of the length of each one of a plurality of parts of the dredger implement extending in series between the tool and the starting point onto the implement co-ordinate system are calculated as a function of two angles measured in orthogonal planes parallel to an axis of the implement co-ordinate system and included between the direction of length of said part and a plane of the implement co-ordinate system. In this method any longitudinal and/or transverse trim of the dredger implement are automatically accounted for in the calculation.

Preferably the anchoring point of the implement is used as the starting point and the co-ordinates with respect to the work co-ordinate system of the anchoring point used as the starting point are assessed by measuring the co-ordinates with respect to the work co-ordinate system of a reference point of the implement and by calculating, each time, the projections of the length of each one of the parts of the implement extending in series between the reference point and the anchoring point onto the implement co-ordinate system as a function of two angles measured in orthogonal planes parallel to an axis of the implement co-ordinate system and included between the longitudinal direction of said part and a plane of the implement co-ordinate system by algebraically summing the projections of the same nature and by translating the position of the anchoring point with respect to the implement co-ordinate system into the work co-ordinate system. Then in measuring the position of the tool a control-signal for controlling the dredger implement can be simultaneously introduced in a simple manner into an arithmetic system for calculating the position variation of the tool as a result of the control-signal.

Since it can be imagined that due to involuntary displacement or deformation of the anchoring means the position of the anchoring point may change, the position of the anchoring point with respect to the work co-ordinate system is preferably assessed from time to time.

When the anchoring point is moved along a trajectory for example, a straight path, the ground talus to be worked by the implement is curved to a lesser extent so that in a simple manner ground slices having a uniform profile of the ground talus can be cut. In such a method it is advisable to continuously assess the position of the anchoring point with respect to the work co-ordinate system.

The invention relates to and provides furthermore a dredger implement comprising a floating body, anchoring means for anchoring the floating body, a ladder movably connected with the floating body, a dredging tool carried by the ladder, controllable displacing means for the controlled displacement of the dredger implement and gauging means for determining the position of a starting point of the dreder implement with respect to a work co-ordinate system and comprising position difference measuring means for determining the relative position of the tool with respect to the starting point, said means comprising angle-measuring means for determining at least one angle included by each one of a plurality of parts extending in series between the tool and the starting point with a plane of the implement co-ordinate system, arithmetic means for calculating projections of the lengths of said parts onto the implement co-ordinate system as a function of the measured angle, adding means for the algebraic summation of the calculated projections of the same nature and rotation-angle measuring means for calculating the rotation of the tool from the implement co-ordinate system into the work co-ordinate system characterized in accordance with the invention in that the angle-measuring means assess at least two angles in the direction of length of the parts in orthogonal planes of the implement co-ordinate system and in that the arithmetic means, each time, calculate the projections of the lengths of the parts onto the implement co-ordinate system.

The invention also relates to a method of steering a dredger implement comprising a cutting member and anchoring means.

Inaccuracies are introduced into dredging operations because the anchoring point is not reliable.

The invention has for its object to decrease such inaccuracies. To this end the method according to the invention is characterized in that in locating the cutting member with respect to the anchoring means at least one correction factor is introduced for correcting errors of the anchoring means.

Preferably a correction factor is introduced for correcting deformation of the anchoring means, for example, bending of an anchoring pile or deformation of the chain line of anchor wires. In addition, play in the anchoring means can be corrected.

The invention relates to and provides furthermore a dredger implement comprising a floating body, a ladder movably connected with the floating body, a dredging tool carried by the ladder, anchoring means for anchoring the dredger implement with respect to the ground, displacing means for displacing the tool with respect to the anchoring means and steering means for steering the displacing means. This dredger implement is characterized in that the steering means are provided with correcting means for correcting errors of the anchoring means.

Finally the invention relates to a method of steering a dredger implement comprising a dredging tool and a suspension transport device, in which the tool is manually steered along a trajectory with a manually set displacement speed, whilst the suspension transport device is manually adjusted.

A method of the kind set forth is known. Steering the dredging tool for hours at a stretch is very tiring, the more so as many meters have to be simultaneously observed. Therefore, steering is performed in an inaccurate manner.

The invention provides a steering that can be carried out in practice with great accuracy, because the control-signals of the manual steering are stored in a program memory and because afterwards the dredging tool is moved by automatic steering along the corresponding trajectories, whilst like the suspension transport device it is steered by the program memory in accordance with the manual steering stored in the program memory.

The invention relates to and provides finally a dredger implement comprising a floating body, a ladder movably connected with the floating body, a dredging tool carried by the ladder, a suspension transport device and comprising steering means for manually steering the tool along a trajectory at a manually set rate and control-means for the manual adjustment of the suspension transport device said dredger implement being characterized in that there is provided a program memory for recording control-signals of the manual steering, in that the steering means can be controlled in accordance with the program memory for moving the dredging tool by automatic control along the corresponding trajectories and in that the suspension transport device can also be controlled in accordance with the program memory.

The above-mentioned and further features of the invention will be described more fully hereinafter with reference to a drawing.

The drawing shows schematically in

FIG. 1 a perspective view of a cutting head suction dredger in an operational stage, FIGS. 1a and 1b a plan view and a profile sectional view respectively of the main dimensions of the cutting work as well as the co-ordinates of the cutting head in the work and a co-ordinate system XYZ of the work, FIG. 2 a plan view of a cutting head suction dredger, FIGS. 3 and 4 a side elevation and a rear view respectively of the cutting head suction dredger of FIG. 1, parts being linked in series one after the other of the cutting head suction dredger of FIG. 1 being shown, FIG. 5 a rear view of a further cutting head suction dredger in accordance with the invention, FIG. 6 a very schematic, perspective view of the ladder of the cutting head suction dredger of FIG. 1 with the associated angle-measuring means, FIGS. 7 and 8 each a view corresponding with that of FIG. 6 of differently constructed angle-measuring means, FIGS. 7a and 8a views corresponding with FIGS. 7 and 8 respectively for a transverse trim or roll angle 50, FIGS. 9 and 9a a plan view and a side elevation respectively of the work of FIG. 1, the cutting operation being carried out with the aid of a tilting or step pile and the cutting head being each time displaced in the Z-direction over a distance 70 in order to obtain successive, parallel cuts, FIGS. 10, 11, 12 and 16 schematic views illustrating the effect of the angle displacements of the piles on the co-ordinates of the cutting head, FIGS. 13a to 13e projections of the anchoring pile for taking into account the position of the anchoring pile in the calculation of the cutting-head co-ordinates in the event of a transverse slope of the floating body, FIGS. 14a to 14e and 15a to 15e projections of the ladder without and with cutting head respectively for taking into account the position of the ladder in the calculation of the cutting-head co-ordinates when the floating body is in a sloping position, FIGS. 17a to 17e projections relating to the distance of the tilting point of the anchoring pile from the rotary point of the ladder, FIGS. 18a to 18e and 19a to 19e projections of the distance between the place of the aerial on the floating body and the tilting point of the anchoring pile, viewed in the longitudinal direction and the transverse direction respectively of the ship, FIG. 20a a side elevation of a detail of the sharply forwardly inclined floating body near the rotary point of the ladder, FIGS. 20b to 20e projections relating to the depth of the draught gauge, FIG. 21 on an enlarged scale the cutting head of the cutting head suction dredger of FIGS. 1 to 4, FIG. 22 a theoretical approximation of a cutting head by comparing it to two relatively spaced spheres, FIGS. 23a and 23b, 24a to 24c and 25a to 25h graphs for selecting from the enveloping spheres the cutting sphere by which the cutting head has to cut at various transverse slopes and tali, FIGS. 26 to 33 graphs of the cutting head suction dredger with highly exaggerated slopes to assess where the cutting sphere to be chosen is situated with respect to the axis of the work both in the transverse and the vertical directions, FIGS. 34 to 42 graphs for assessing in conjunction with FIGS. 26 to 33 where the centre of the cutting spherical part of the cutting head is located with respect to the pivotal point of the cutting head suction dredger, FIGS. 43 and 44 a side elevation and a rear view respectively of the cutting head suction dredger of FIGS. 1 to 4 corresponding with the views of FIGS. 3 and 4, though more schematical, FIG. 45 an assembly of the measuring instruments shown schematically, used in the cutting head suction dredger of FIGS. 1 to 4, FIG. 46 a schematic longitudinal sectional view of the cutting head, FIG. 47 on an enlarged scale fractions XLVII of FIG. 1a, FIG. 48 on a reduced scale a plan view of FIG. 1b, FIG. 49 a schematic plan view of the cutting head suction dredger of FIGS. 1 to 4, the Z co-ordinate of the cutting head being indicated, FIG. 50 a sectional view L—L of FIG. 48 illustrating the path covered by the cutting head, FIGS. 51a and 51b a sectional view and a plan view respectively of a fraction of a different work with a broken talus, FIGS. 52 and 53 a schematic side elevation and a rear view respectively of the cutting head suction dredger of FIGS. 1 to 4 for calculating the distance from aerial to pile point, FIGS. 54 to 56 and FIG. 58 views corresponding with FIG. 53 relating each to a different position of the cutting head suction dredger, FIGS. 55, 57 and 59 views corresponding with FIG. 52, FIG. 60 a plan view of the correction calculation of sounding in the aerial, FIGS. 61 to 64 schematic side elevations of the cutting head suction dredger in different positions of the anchoring pile, FIG. 65 a vertical sectional view of detail LXV of FIG. 3, FIG. 66 a fraction of the indicating means of the cutting head suction dredger of FIGS. 1 to 4, FIGS. 67 and 68 a plan view and a rear view respectively of the anchoring pile of the cutting head suction dredger of FIGS. 1 to 4 in different positions, FIGS. 69 to 73 together a scheme of the arithmetic implement for calculating the co-ordinates of the cutting tip of the cutting head, FIGS. 74 and 75 a rear view and a side elevation respectively of a different cutting head suction dredger, FIG. 76 a scheme for steering the cutting head suction dredger of FIGS. 1 to 4, FIGS. 77 and 78 a side elevation and a front view respectively of a dredger steered in accordance with the invention, FIGS. 79 and 80 on an enlarged scale a side elevation and a front view respectively of detail LXXIX of the dredger implement of FIG. 77, and FIGS. 81 and 82 schemes of cutting envelopes for the cutting member of the dredger implement of FIG. 77 corresponding with FIGS. 79 and 80.

The cutting head suction dredger indicated generally at 1 in FIGS. 2, 3 and 4 contains many conventional features. Thus, the buoyant hull 13 is provided at its forward end or bow with pivot means P and P' which cooperate with suitable ears or members on the dredger ladder 14 to establish a pivotal connection between the ladder 14 and the hull 13 about the transverse hinge axis HA, as is conventional. This hinge axis HA, as will be seen in FIG. 2, intersects at right angles at the point 31 with a longitudinal medial plane 100 which is normal to the "deck" of the dredger. This plane 100 will be seen to pass through the axis of the ladder 14 and through the cutter head 6 so as to divide it in half. In so doing, the plane 100 passes through the points 10a and 10b which are the centers of identical imaginary spheres whose outer imaginary surfaces simulate (for the purposes of this invention) the cutting envelope 8 of the cutter head 6.

As is also conventional, the hull 13 is provided with two spuds for "walking" the dredger. As shown, the spud 18B is a walking spud whereas the spud 18S is a working spud. They may both be formed in the manner of the spud 18B although in FIGS. 2-4, the working spud 18S is provided with a base plate 28 of substantial flat bearing area which is connected to the ball-shaped end 29 of the spud by a swivel socket. The other spud 18B is simply provided with a ground-piercing lower end. The stanchions SB on the hull 13 journal the trunnions TB and the stanchions SS journal the trunnions TS of the collars CB and CS for the two spuds 18B and 18S respectively. Each of these collars is provided with a double acting piston/cylinder assembly 205 by means of which the spud collars may be pivoted about the axes of their trunnions and held in such positions. The winches WB and WS are provided on the hull 13 to raise and lower the respective spuds 18B and 18S in their guide collars CB and Cs. In addition, the winch 17 is provided to control the cable 16 sheaved on the boom 15 and thus raise and lower the cutter head/ladder assembly about the transverse axis HA. In general, all of these arrangements are conventional, as are the two control cables CC1 and CC2 attached to the ladder 14 near the cutter head 6 and which are wound on the stationary winches SW1 and SW2 respectively. The winches SW1 and SW2 are controlled—one paying out while the other is ruled in—to swing the cutter head 6 about the pivot point 22 provided by the working spud 18S to the end points of its travel which define the profile of the channel so cut.

To appreciate this cutting action, reference is had to FIGS. 1, 1a and 1b. FIG. 1 shows the hull 13, ladder 14, cutting head 6 and spuds 18B and 18S diagrammatically. The transverse vertical section of the underwater profile of the channel to be cut is shown in FIG. 1b and a plan view thereof is shown in FIG. 1a. This profile is laid out along the desired route, to the desired depth and width and with the desired side slopes, using the vertical reference plane 104 and the horizontal reference plane which is at the water level 5 of mean high tide. The intersection of these two planes defines the path of the channel, the plane 104 being the center plane of the channel, as shown. The channel is designed and laid out with respect to this path so that at any point therealong, the depth Y to the bottom 12 of the channel as well as the X dimensions to the sides are known. Normally, the path is defined by a series of straight lines of differing azimuths, in accord with convention.

According to this invention, means are provided which allow the X', Y', Z' coordinate system of the dredger shown in FIG. 1 to be related back to a fixed reference coordinate system X, Y, Z to determine what points on the cutting head envelope 8 (as simulated by the imaginary sphere whose centers are located at 10a and 10b in FIG. 2, for example) represent the maximum X and Y displacement. In this way, the cutter head can be controlled by the winches SW1 and SW2 to form the desired profile for the channel with far greater precision than has heretofore been possible. The cutting head suction dredger 1 turns about ground supports, which may be constructed in the form of anchoring piles 18B and 18S (FIGS. 1 to 4) or of cable piles 19 with ground anchors 20 (FIG. 5). The place of the cutting head suction dredger 1 in the work 2 is determined by measurements via an aerial 21 arranged on the floating body 13 and forming a reference point. The pivotal point 22, that is to say the lower end of the anchoring pile 18, said pivotal point 22 forming the anchoring point and being used as a starting point.

FIGS. 1a, 1b, 9 and 48 illustrate how the cutting head suction dredger 1 is operative in the channel 2. The work or channel 2 is defined with the aid of a rectangular work co-ordinate system XYZ located with the aid of beacons 134 as shown in FIG. 48. The work co-ordinate system XYZ has its origin O and its X- and Z-axes in a horizontal plane at the level 5 of mean high tide, whereas the Y co-ordinate is located in the vertical plane of symmetry 104 of the channel 2, whilst the Y-X plane passes through the pivotal point 22.

The position of the aerial 21 of the cutting head suction dredger 1 in the work co-ordinate system XYZ is measured with respect to the beacons 134.

The X co-ordinates are designated by $X_S$ or $X_B$ according as they are located on the right-hand or left-hand side of the work axis Z.

The co-ordinate system X'Y'Z' of the implement shown in FIG. 1 and employed in the arithmetic example comprises:

a horizontal Z' axis consisting of the line of intersection of the longitudinal median plane 100 of the floating body 13 with a horizontal plane at the water surface 39;

a Y' axis consisting of the line of intersection of a vertical plane 3 orthogonal to the Z' co-ordinate and passing through the point 22 and the plane 100 containing the Z' co-ordinate;

an X' axis at right angles to the Y' and Z' axes and lying in the plane 3 containing the point 22, and an origin O'.

This co-ordinate system X'Y'Z' turns about the pivotal point 22 during the turn of the cutting head suction dredger 1 and is also subjected to motions along the X', Y' and Z' axes due to water or wave action upon the hull.

FIGS. 21 and 22 illustrate analyses of the cutting envelope 8 of the cutting head 6.

For the sake of simplicity a simple cutting head structure is chosen for this arithmetic example, the cutting envelope 8 being substantially represented by two relatively spaced imaginary spheres 9a and 9b having spherical radii 10a and 10b centered at the point 36 and the point 71, the latter being spaced beyond the former by a distance 69 along the axis 61.

In order to steer the cutting head 6 with the use of the method according to the invention the following arithmetic magnitudes are employed in the required calculations:

the distance 76 of the aerial 21 from the pivot point 23 of the anchoring pile (see FIG. 3), about which point 23 the anchoring pile 18 can be pivoted with respect to the floating body 13, the anchoring pile length 25, whilst by measurement with the aid of an anchoring pile meter 56 the upper part 26 of the anchoring pile projecting above the pivot point 23 of the anchoring pile and, if the spud 18S is formed like 18B, the length 27 of the lowermost anchoring pile portion penetrating into the ground, the anchoring pile working length 30=(25)-(26)-(27) (FIGS. 3 and 44), the distance 73 of the rotary point 31 on the pivot axis of the ladder from the pivot point 23 of the anchoring pile (FIGS. 3 and 43), the anchoring pile angle 33 measured by means of an anchoring pile angle meter 57, the sense (+ or −) of said angle being scanned by means of an anchoring pile direction meter 58 (FIGS. 3 and 13), the ladder angle 34 included by the horizontal 60 and the line 236 between the rotary point 31 of the ladder and the centre 36 of the first spherical part 9a of the cutting head 6 with the radius 10a, said ladder angle 34 being determined by means of a ladder angle meter 59 (FIGS. 3 and 22), the fixed angle 35 between the axis 61 of the cutting head 6 and the line 236, the distance 37 between the first center point 36 and the rotary point 31 of the ladder on the line 236, the longitudinal trim angle or pitch angle 38 of the floating body 13, measured with the aid of the pitch angle meter 42, the sense (+ or −) being determined by means of the pitch direction meter 43, the draught 46 of the rotary point 31 of the ladder with respect to the water surface 39, determined by means of a draught gauge 45, the distance 81 between the rotary point 31 of the ladder and the draught gauge 45 being taken into account, the fixed angle 48 between the deck 41 and the line 44 between the pivot point 23 of the anchoring pile and the rotary point 31 of the ladder, the tide difference 49 of the water surface 39 with respect to a starting level 5, the transverse trim angle 50 (i.e., the roll angle, see FIG. 4) of the floating body 13, measured by an angle meter 51, the (starboard or port) side being determined by means of a direction meter 52, the distance 47 between the longitudinal median axis 100 of the floating body 13 and the plane 40 containing the plane 63 parallel to the plane 10 and going through the pivotal point 22, and the swing angle 53 (FIGS. 1 and 2) between the Z co-ordinate of a work co-ordinate system of the work 2 and the Z' co-ordinate of the implement co-ordinate system, measured with the aid of the compass 54 on board, a direction meter 55 scanning whether the Z' axis is turned with respect to the Z axis towards starboard (S) or to port (B).

In the formulae distances and angles are placed between brackets.

In FIGS. 10 to 12 is calculated the consequence of the transverse trim or roll angle 50 on the ground distance 64 between fixed piles $18_B$ and $18_S$ with respect to the projection of the actual distance $$2 \times (47), (64) = \frac{2 \times (47)}{\cos(50)}.$$

This measure is taken into account in determining the step distance 65, which depends upon the swing angle $53_S$ and $53_B$ respectively i.e. as follows:

step distance 65 =

$$\frac{2 \times (47)}{\cos(50_S)} \times \sin(53_S) + \frac{2 \times (47)}{\cos(50_B)} \times \sin(53_B).$$

In FIG. 12 the step distance 65 is determined in a similar manner without taking into account the roll angle when a tilting anchoring pile 18 is used. The tilting pile angles 33 and 33' appear to bring about a step distance 65 which depends upon the tilting pile working length 30 and the tilting pile angles 33 and 33' as follows: step distance $65 = (30') \times \cos(33') - (30) \times \cos(33)$.

FIG. 10 is a rear view of the arrangement of FIG. 12 and the consequences of the roll angle 50 on the ground distance 64 when tilting anchoring piles 18 are used.

Since all angles are measured with respect to the vertical, compensation must be made whenever the implement is subjected to roll angle 50. This compensation involves the projection angle 67 and is determined as follows (see FIGS. 13a, 13b, 13c, 13d and 13e).

In these Figures it is assumed that the running length 30 of the anchoring pile 18 does practically not exhibit any change by the action of the elastic pile bending. In the plane 40 containing the points ABCD the real pile working length 30 is indicated by EC. The vertical plane A"B"CD going through A" (pivotal point 22) is turned at the roll angle 50 about the line CD into the plane ABCD, A"B" thus getting at a line EF (FIG. 13b). FIG. 13c shows the plane ABCD after said turn. From $$BC = \frac{(30)\sin(33)}{\cos(50)} \text{ and } AB = (30)\cos(33) \text{ results}$$

$$\tan(67) = \frac{(30)\sin(33)}{(30)\cos(33)\cos(50)} = \frac{\tan(33)}{\cos(50)}$$

Therefrom results the value of the angle 67 and hence the values sin (67) and cos (67) can be generated.

In FIG. 13d the pile working length 30 is turned about point C (tilting point 23 of the anchoring pile) to point G on the line AC in order to determine $X_{30}$, $Y_{30}$ and $Z_{30}$ of the pile working length 30 onto the X'Y'Z' co-ordinate system.

$Z'_{30} = GH = (30) \cos(67),$ $Y''_{30} = CH = (30) \sin(67)$ (see FIG. 13d), $Y'_{30} = Y_{30} = CJ = (30) \sin(67) \times \cos(50)$ (see FIG. 13e), and $X'_{30} = HJ = (30) \sin(67) \times \sin(50).$ The projections $1_{X'}$, $1_{Y'}$, and $1_{Z'}$, of each of the parts of the dredger implement extending in series between the tool i.e. the cutting head 6 and the starting point i.e. the pivotal point 22 of the anchoring pile 18 are each time calculated as a function of at least two angles for example 34 and 50 (see FIG. 6) relating to the angles of the ladder 14 measured in orthogonal planes parallel to a co-ordinate of the implement co-ordinate system X'Y'Z' and included between the direction of length of the part and a plane of the implement co-ordinate system X'Y'Z'. For this purpose angle meters 59 and 51 (see FIG. 6) are provided and equipped each with a pendulum 152 with a weight, thus measuring each an angle relative to the vertical.

FIG. 7 shows the angle meters 51 and 59 in combination. FIG. 8 shows three angle meters 51, 59 and 159, the meter 159 measuring in addition an angle 68 in the tilted longitudinal plane of the ladder 14, which angle 68 can be calculated as a projection angle in dependence upon the angles 34 and 50.

In order to determine the co-ordinates of the first cutting point 36 in the work co-ordinate system XYZ, first the projections of the distance 37 onto the implement co-ordinate system X'Y'Z' are determined. This calculation starts from the distance 37 between the first cutting point 36 and the rotary point 31 of the ladder, the roll angle 50 as recorded by the transverse trim meter 51 and the direction meter 52, and the ladder angle 34 as recorded by the ladder angle meter 59.

The calculation of the projections $X'_{37}$, $Y'_{37}$ and $Z'_{37}$ is performed with the aid of FIGS. 14a to 14e similarly to the calculation of $X'_{30}$, $Y'_{30}$ and $Z'_{30}$ of FIGS. 13a to 13e.

From the projection onto the plane ABCD the projection angle 68 is determined as follows:

$\tan(68) = \tan(34)/\cos(50),$ from which follows the magnitude of the projection angle 68.

$Z'_{37} = GH = (37) \cos(68),$ $Y''_{37} = CH = (37) \sin(68),$ $Y_{37} = Y'_{37} = CJ = (37) \sin(68) \times \cos(50),$ $X'_{37} = HJ = (37) \sin(68) \times \sin(50).$ The calculation of the projections $X'_{69}$, $Y'_{69}$ and $Z'_{69}$ of the distance 69 between the first cutting point 36 and the second cutting point 71 onto the X',Y',Z' co-ordinate system is made with reference to FIGS. 15a to 15e, starting from the distance 69, the transverse trim angle 50, the ladder angle 34 and the angle 35 included between the cutting head axis 61 and the line 236 going through the rotary point 31 of the ladder and the first cutting point 36. By plotting the foregoing values in FIG. 15a starting from point C, the point A" is found. FIG. 15d shows that the projection angle 72 of the distance 69 is equal to the projection angle 68 (from FIG. 14d) plus the angle 35. It furthermore follows from FIGS. 15d and 15e, that $$Z'_{69} = (69) \cos (72),$$

$$Y'_{30} = (69) \sin (72),$$

$$Y_{69} = Y''_{69} = (69) \sin (72) \times \cos (50),$$

$$X'_{69} = (69) \sin (72) \times \sin (50).$$

With the aid of FIGS. 17a to 17e the projections $X'_{73}$, $Y'_{73}$ and $Z'_{73}$ of the distance 73 (FIGS. 3 and 43) between the tilting point 23 of the anchoring pile and the rotary point 31 of the ladder onto the $X'Y'Z'$ co-ordinate system are determined. This starts from the pitch angle 38 measured by a pitch angle meter 42 and a pitch angle direction meter 43 (FIG. 3) and from an angle 48 included between the line 44 going through the anchoring pile tilting point 23 and the ladder rotary point 31 on the one hand and the horizon at a pitch angle 38=0 and a roll angle 50=0 on the other. The projection angle 74 follows from:

$$\tan (74) = \tan ((48) + (38))/\cos (50)$$

$$Z'_{73} = (73) \cos (74),$$

$$Y'_{73} = (73) \sin (74),$$

$$Y_{73} = Y''_{73} = (73) \sin (74) \times \cos (50),$$

$$X'_{73} = (73) \sin (74) \times \sin (50).$$

Then the position on the aerial 21 with respect to the anchoring pile tilting point 23 is introduced by starting from:
1(e) the distance 47 between the aerial 21 and the projection plane 40 going through the anchoring pile tilting point 23 and being parallel to the plane 100 (FIGS. 4 and 5),
2(e) the distance 76 between the projection point 21A of the aerial 21 onto the plane 40 on the one hand and the anchoring pile tilting point 23 on the other (FIGS. 3, 4 and 5).

With the aid of FIGS. 18a to 18e the projections $X'_{76}$, $Y'_{76}$ and $Z'_{76}$ are determined. This starts from the pitch angle 38 and an angle 78 included between the line 70 going through the anchoring pile tilting point 23 and the projection point 21A on the one hand and the horizontal at a pitch angle 38=0 and a roll angle 50=0 on the other. The projection angle 77 results from:

$$\tan (77) = \tan ((78) - (38))/\cos (50)$$

$$Z'_{76} = (76) \cos (77),$$

$$Y'_{76} = (76) \sin (77),$$

$$Y_{76} = Y''_{76} = (76) \sin (77) \times \cos (50),$$

$$X'_{76} = (76) \sin (77) \times \sin (50).$$

With the aid of FIGS. 19a to 19e are determined the projections $X'_{47}$, $Y'_{47}$ and $Z'_{47}$ of the distance 47 onto the $X'Y'Z'$ co-ordinate system. The projection angle 79 follows from:

$$\tan (79) = \tan (50)/\cos (38)$$

$$Z'_{47} = (47) \sin (79) \times \sin (38),$$

$$Y'_{47} = (47) \sin (79),$$

$$Y_{47} = Y''_{47} = (47) \sin (79) \times \cos (38),$$

$$X'_{47} = (47) \cos (79).$$

With the aid of a draught meter 45 arranged in the plane 100 the draught 46 of the ladder rotary point 31 beneath the water surface 39 is determined (see FIGS. 3, 43 and 20a to 20e). Draught 46=draught 82 of the draught meter 45 minus the projection $Y_{81}$ of the distance 81 between the ladder rotary point 31 and the draught member 45. $Y_{81}$ is determined with the aid of FIGS. 20a to 20e. These Figures are basically different from FIGS. 13a to 13e in that the distance 81 is at right angles to EC and hence at right angle to AC. The projection angle 80 is determined by $$\tan (80) = \tan (38)/\cos (50)$$

$$Y_{81} = Y''_{81} = (81) \cos (80) \times \cos (50),$$

$$(46) = (82) - Y_{81}, \text{ or}$$

$$(46) = (82) - (81) \cos (80) \times \cos (50).$$

FIGS. 21 and 46 show by way of example a cutting head 6, its cutting envelope 8 is formed on an approximation by two relatively spaced spherical parts 9a and 9b having radii 10a and 10b and centers 36 and 71 respectively. The ground surfaces 12a and 12b being at different talus angles are touched by the cutting envelope 8 at the points of intersection 11a and 11b. In this configuration the perpendiculars 83a and 83b of the points of intersection 11a and 11b go through the associated center 71.

FIG. 22 indicates schematically the distances 37 and 69 and the angular positions 34 and 35 respectively of the cutting head ladder 14 with the cutting head 6 as calculated in FIGS. 14 and 15, the two centers 36 and 71 being located in the ship's longitudinal plane 100. In the determination of that side of the cutting head 6 which works the talus the talus is termed positive (+94) in FIG. 47, when it rises in the direction away from the YZ plane, and negative (−94), when it drops in the direction away from the YZ plane.

FIG. 23a shows for a positive talus a sectional view at right angles to the talus 84 and FIG. 23b shows a plan view for assessing the point of intersection 11a or 11b coming into contact with a talus at the approach of this talus rising from a work axis 104 (positive talus) (see FIG. 47), taking into account a roll angle 50 (see the calculations in FIGS. 14 and 15).

The angle 85 included between the projection 88 of the distance 69 onto the horizontal plane on the one hand and the vertical plane 237 going through the second cutting point 71, said plane being parallel to Z' (FIG. 1), on the other, is calculated from the equation:

$$\tan (85) = X'_{69}/Z'_{69},$$

from which follows angle 85.

The projection 88 of the distance 69 onto the horizontal XZ plane follows from:

$$(88) = Z'_{69}/\cos (85).$$

The projection $X_{69}$ of the distance 69 onto the vertical XY plane at right angles to the talus 84, measured horizontally, can be calculated from:

$$X_{69} = (88) \times \sin((53)+(85)),$$

wherein 52 represents the swing angle (FIG. 2) of the cutting head suction dredger 1 in the work co-ordinate system.

The angle 90 between the horizontal 60 going through the second cutting point 71 and the projection 92 of the distance 69 onto the vertical XY plane at right angles to the talus 84 can be calculated from:

$$\tan(90) = Y_{69}/X_{69}.$$

The projection 92 in the case of a positive talus is calculated from:

$$(92) = X_{69}/\cos(90).$$

The projection 93 of the projection 92 onto a plane 91 at right angles to a talus 84 being at a talus angle 94 and being parallel to the Z co-ordinate is calculated from:

$$(93) = (92) \sin((90)+(94)).$$

From these calculations it can be derived that:

If spherical radius $10a$ = spherical radius $10b$ + projection 93, the envelopes of the spheres $9a$ and $9b$ both intersect the talus.

If spherical radius $10a$ is longer than spherical radius $10b$ + projection 93, only spherical part $9a$ will intersect.

If spherical radius $10a$ is shorter than spherical radius $10b$ + projection 93, only the spherical part $9b$ will intersect.

FIGS. 24a and 24b show each a situation corresponding to FIG. 23a for two different negative tali 84 downwardly inclined from the work axial plane 104 of the work.

From FIG. 24a, in which (94) is larger than (90), it can be derived with a negative talus that:

$$(93) = (92) \sin((94)-(90)).$$

From FIG. 24b, in which (90) is larger than (94), it can be derived with a negative talus that:

$$(93) = (92) \sin((90)-(94)).$$

In FIGS. 25a to 25h, in eight work situations, the conditions have been drafted in order to determine independently of the direction of the roll angle 50 of the floating body 13 and its swing direction, the value of the algebraic sum of the angles 53 and 85, which sum plays an important part in the location of the point of intersection of the cutting head 6 as explained with reference to FIGS. 23 and 24.

The direction indicator 52 indicates whether the roll angle 50 of the floating body 13 is a $50_S$ or a $50_B$. $50_S$ is a roll angle at which the starboard side is lower than the port side, which is indicated in FIG. 4 by solid lines. For the opposite situation broken lines indicate in FIG. 4 an angle $50_B$.

Herein a starboard swing $53_S$ has to be understood to mean that the median, longitudinal plane 100 of the floating body 13 of FIG. 2 has swung to the starboard side with respect to the work axial plane 104. The port swing $53_B$ means the opposite position. In practical work angle 53 is always smaller than 90°.

FIG. 25a illustrates a work situation with $50_S$ and $53_B$. Then $X_{69} = (88) \sin((53)+(85))$.

In FIG. 25b with $50_S$ and $53_B$ and $(53)+(85)$ being larger than 90°, $X_{69} = (88) \sin((53)+(85)-90°)$.

In FIG. 25c with $50_B$ and $53_B$ and (85) being larger than (53), $X_{69} = (88) \sin((85)-(53))$.

In FIG. 25d with $50_B$ and $53_B$ and (53) being larger than (85), $X_{69} = (88) \sin((53)-(85))$.

In FIG. 25e with $50_S$ and $53_S$ and (85) being larger than (53), $X_{69} = (88) \sin((85)-(53))$.

In FIG. 25f with $50_S$ and $53_S$ and (53) being larger than (85), $X_{69} = (88) \sin((53)-(85))$.

In FIGS. 25g and 25h with $50_B$ and $53_B$ and (53) being larger than (85), $X_{69} = (88) \sin((53)+(85))$.

FIGS. 26 to 33 show schematically in exaggerated form in inclined position, a rear view of the cutting head suction dredger 1 (FIGS. 4 and 5) in eight work situations and provide an insight with respect to the position of the first center 36 with respect to the pivotal point 22.

These Figures indicate:

the vertical longitudinal plane 100' at an angle $50 = 0°$;

the distance 96 of the plane 106 going through center 36 and parallel to the plane 100' from the vertical plane 95 parallel to the plane 100';

the distance 97 between the plane 98 going through the pivotal point 22 and parallel to Z' and the plane 99 going through the center 36 and parallel to Z';

the selected anchoring pile $18_S$ or $18_B$;

the selected roll angle $50_S$ or $50_B$;

the location beneath the deck 41 of the first cutting point 36 with respect to the pivotal point 22 at a greater or smaller depth (36 deeper or 22 deeper); and the selection of the operative spherical part $9a$ or $9b$.

In the work situation of FIG. 26 with $50_S$; $18_S$; 22 deeper; and (97) lower than (47)/tan (50) the following calculation applies.

From FIG. 13d follows the projection of the anchoring pile working length with the arithmetic magnitude $Y''_{30} = (30) \sin(67)$, briefly indicated by 112.

From FIG. 14d follows the projection of the ladder, $Y''_{37} = (37) \sin(68)$.

From FIG. 17d follows the projection of the floating body $Y''_{73} = (73) \sin(74)$.

From FIG. 15d follows the projection of the cutting head $Y''_{69} = (69) \sin(72)$.

According as the spherical part $9b$ or $9a$ (FIG. 21) is cutting, with the teachings of FIGS. 23a, 23b, 24a and 24b, the term $Y''_{69}$ is either introduced or not introduced into an arithmetic magnitude $$(113) = Y''_{37} + Y''_{73} + Y''_{69}.$$

If spherical part $9a$ is cutting, the distance 69 and hence all projections derived therefrom are introduced with the value = 0 into the formulae. (47): tan (50) is briefly indicated by the arithmetic magnitude 114. Since in FIG. 26 (22) is deeper or, in other terms, (112) is greater than (113), $(97) = (112)-(113)$.

In FIG. 26 it applies that $(96) = ((114)-(97)) \sin(50)$. This formula is also true for the reflection of FIG. 26 i.e. at $50_B$, $18_B$, 22 deeper, $9a$ and (97) lower than (114).

In FIG. 27 it applies at $50_S$, $18_S$, 22 deeper and (97) greater than (114) that $(96) = ((97)-(114)) \sin(50)$. This formula also applies to the reflection of FIG. 27 i.e. at $50_B$, $18_B$, 22 deeper and (97) greater than (114).

FIG. 28 shows the work situation at $50_S$, $18_S$, 36 deeper and (97) lower than (115). (115) is an arithmetic magnitude $(115)=47/\tan \frac{1}{2}(50)$. 36 deeper means (113) greater than (112). It follows therefrom that $(96)=((114)+(97)) \sin (50)$. This formula also applies to the reflection of FIG. 28 at $50_B$, $18_B$, 36 deeper and (97) lower than (115).

Figure 31:
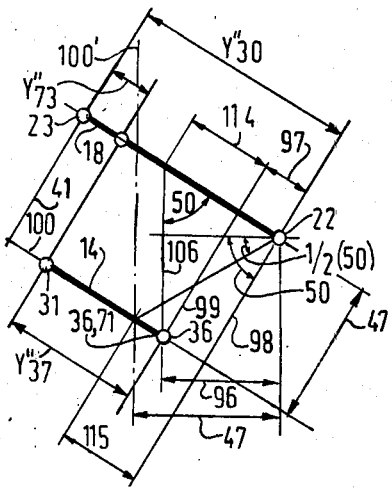

In the work situation of FIG. 31 at $50_B$, $18_S$, 22 deeper and (97) lower than (115) it applies that $(96)=((114)+(97)) \sin (50)$. This formula also applies to the reflection of FIG. 31 at $50_S$, $18_B$, 22 deeper and (97) lower than (115).

In the work situation of FIG. 32 at $50_B$, $18_S$, 36 deeper and (97) lower than (114) it is true that $(96)=((114)-(97)) \sin (50)$. This formula also applies to the reflection of FIG. 32 at $50_S$, $18_B$, 36 deeper and (97) lower than (114).

In the work situation of FIG. 33 at $50_B$, $18_S$, 36 deeper and (97) greater than (114) it is true that $(96)=((97)-(114)) \sin (50)$. This formula also applies to the reflection of FIG. 33 at $50_S$, $18_B$, 36 deeper and (97) greater than (114).

With the aid of FIGS. 34 to 42 it is determined in the XYZ co-ordinate system where the centre of the cutting spherical part 9a or 9b is located with respect to the pivotal point 22.

FIG. 34 is a plan view of the work situations of FIGS. 26, 28, 31 and 32. In the X′Y′Z′ co-ordinate system is first determined the projection 101 of the distance between the centers 36 and 71 on the one hand and the pivotal point 22 on the other hand onto the Z′ axis: $(101)=Z'_{30}+Z'_{73}+Z'_{37}+Z'_{69}$, if the spherical part 9b is cutting, or $(101)=Z'_{30}+Z'_{73}+Z'_{37}$, if the spherical part 9a is cutting. In FIGS. 34 to 42 is assumed by way of example the situation in which the spherical part 9a is cutting.

The plane 104″ is located at a distance 47 from the pivotal point 22 and is parallel to the plane 104 and coincides with the longitudinal median plane 100 of the cutting head suction dredger 1, when it is parallel to the plane 104 at a roll angle $50=0$. The plane 106 is located at a distance 96 (FIGS. 34 to 42) from the pivotal point 22 and is at a swing angle 53 to the plane 104″. In FIG. 34 is plotted in the plane 106 the projection 101. Now the X″ co-ordinate can be calculated with respect to the plane 104″ and the Z co-ordinates. Substitution of 103 for (96) sin (53); of 102 for (96) cos (53); of 32 for (101) cos (53); of 75 for (101) sin (53), as an arithmetic magnitude gives $Z_{36}=(32)-(103)$ and $X''_{B36}=(75)-((47)-(102))$. These formulae apply to the work situation of FIG. 34 at $18_S$ and $53_B$. To the reflection of FIG. 34 at $18_B$ and $53_S$ applies: $Z_{36}=(32)-(103)$ and $X''_{S36}=(75)-((47)-(102))$.

Similarly in FIG. 35 for the work situations of FIGS. 27 and 33 at $18_S$ and $53_B$ $Z_{36}=(32)+(103)$ and $X''_{B36}=(75)-((102)+(47))$. For the reflection of FIG. 35 at $18_B$ and $53_S$ is $Z_{36}=(32)+(103)$ and $X''_{S36}=(75)-((102)+(47))$.

Figure 29:
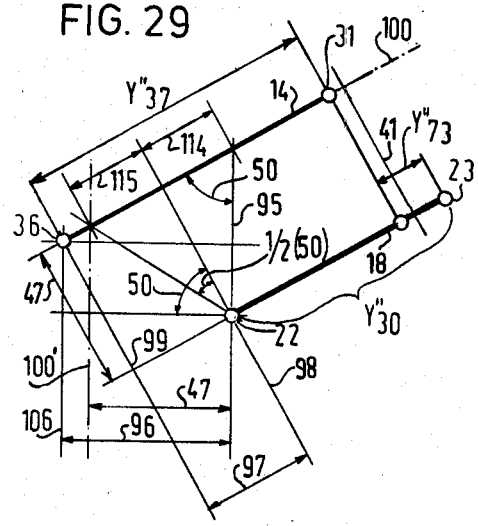
FIG. 29 shows the work situation at $50_S$, $18_S$, 36 deeper and (97) greater than (115), wherein $(96)=((114)+(97)) \sin (50)$. This formula also applies to the reflection of FIG. 29 at $50_B$, $18_B$, 36 deeper and (97) greater than (115).
Figure 30:
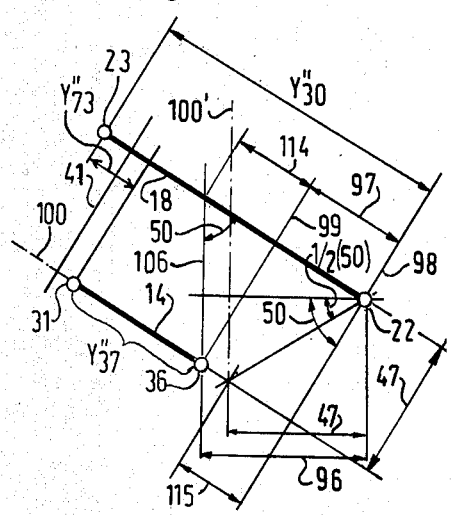
FIG. 30 shows the work situation at $50_B$, $18_S$, 22 deeper and (97) greater than (115), wherein $(96)=((114)+(97)) \sin (50)$. This formula is also true for the reflection of FIG. 30 at $50_S$, $18_B$, 22 deeper and (97) greater than (115).

In FIG. 36 for the work situations of FIGS. 29 and 30 at $18_S$ and $53_B$ is $Z_{36}=(32)-(103)$ and $X''_{B36}=(75)+((102)-(47))$. For the reflection of FIG. 36 at $18_B$ and $53_S$ is $Z_{36}=(32)-(103)$ and $X''_{S36}=(75)+((102)-(47))$.

In FIG. 37 for the work situations of FIGS. 26, 28, 31 and 32 at $18_S$ and $53_S$ is $Z_{36}=(32)+(102)$ and $X''_{S36}=(75)+((47)-(102))$. For the reflection of FIG. 37 at $18_B$ and $53_B$ is $Z_{36}=(32)+(103)$ and $X''_{B36}=(74)+((47)-(102))$.

In FIG. 38 for the work situations of FIGS. 27 and 33 at $18_S$ and $53_S$ is $Z_{36}=(32)-(103)$ and $X''_{S36}=(75)+((102)+(47))$. For the reflection of FIG. 38 at $18_B$ and $53_B$ is $Z_{36}=(32)-(103)$ and $X''_{B36}=(75)+((102)+(47))$.

In FIG. 39 for the work situations of FIGS. 29 and 30 at $18_S$ and $53_S$ is $Z_{36}=(32)+(103)$ and $X''_{S36}=(75)-((102)-(47))$. For the reflection of FIG. 39 at $18_B$ and $53_B$ is $Z_{36}=(32)+(103)$ and $X''_{B36}=(75)-((102)-(47))$.

Figure 40:
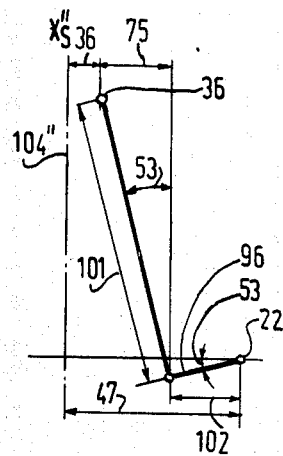
Figure 41:
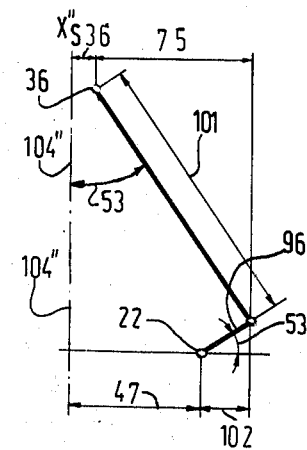
Figure 42:
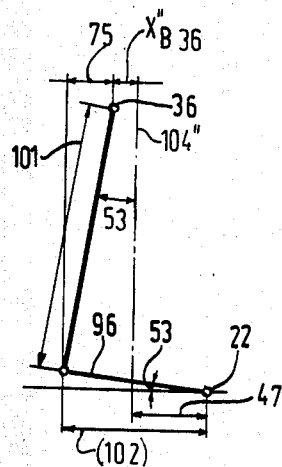

FIGS. 40, 41 and 42 show that at the negative result found there for $X''_{B36}$ or $X_{S36}$ the value has to be presented as positive $X''_{S36}$ and $X''_{B36}$ respectively.

In FIG. 40 for the work situations of FIGS. 26, 28, 31 and 32 at $18_S$ and $53_B$ $X''_{S36}=-X''_{B36}=(75)-((47)-(102))$. For the reflection of FIG. 40 at $18_B$ and $53_S$ is $X''_{B36}=-X'_{S36}=(75)-((47)-(102))$.

In FIG. 41 for the work situations of FIGS. 27 and 33 at $18_S$ and $53_B$ is $X''_{S36}=-X''_{B36}=(75)-((102)+(47))$. For the reflection of FIG. 41 at $18_B$ and $53_S$ is $X''_{B36}=-X''_{S36}=(75)-((102)+(47))$.

In FIG. 42 for the work situations of FIGS. 29 and 30 at $18_S$ and $53_S$ is $X''_{B36}=-X''_{S36}=(75)-((102)-(47))$. For the reflection of FIG. 42 at $18_B$ and $53_B$ is $X''_{S36}=-X''_{B36}=(75)-((102)-(47))$.

Figure 52:
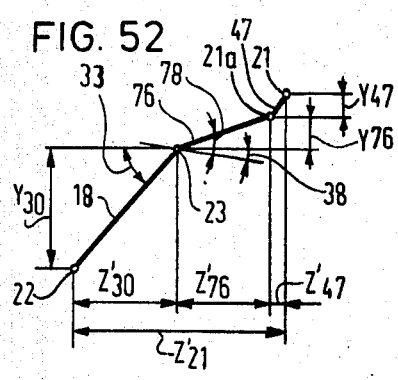

FIG. 52 shows schematically the mode of calculation of the horizontal distance $Z'_{21}$ of the aerial 21 from the pivotal point 22 in different trim directions and in different positions of the anchoring pile $18_S$, said distance $Z'_{21}$ being projected onto the vertical longitudinal plane 100″ of the ship:

$$Z'_{21}=Z'_{30}+Z'_{76}+Z'_{47}.$$

Figure 53:
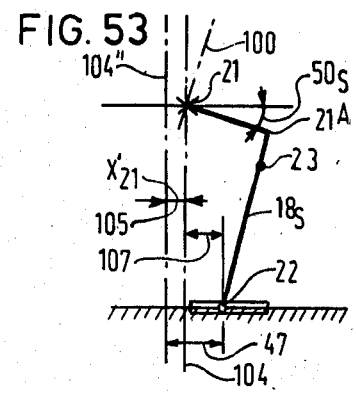
Figure 54:
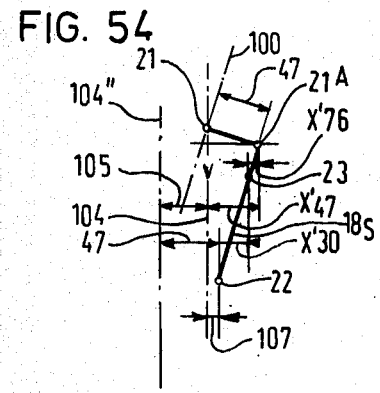
Figure 55:
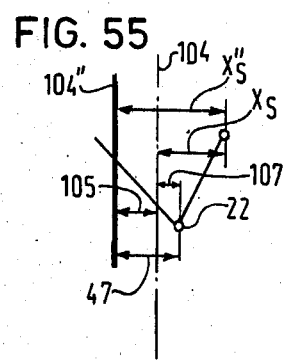

In FIG. 53—in contrast to the real situation accounted for in this description hereinbelow—it is assumed that the aerial 21 is accurately adjusted to the work axial plane 104 with a direction of the Z′ co-ordinate parallel to the Z co-ordinate, be it at a roll angle $50_S$ of the cutting head suction dredger 1, so that a deviation 105 results for each X-co-ordinate, which is taken into account in the calculation as shown in FIGS. 54 and 55.

FIGS. 54 (rear view) and 55 (plan view) show the situation for a turn about the pivotal point 22 with an anchoring pile $18_S$ and a roll angle $50_S$ of the cutting head suction dredger 1, whilst the aerial 21 is located between the pivotal point 22 and the plane 104″. The deviation 105 between the planes 104 and 104″ is $X''_{21}$. $(105)=(47)-(107)$, wherein the arithmetic magnitude $(107)=X'_{47}-(X'_{76}+X'_{30})$.

In the work situation of FIGS. 54 and 55 each $X_S=X''_S-(105)$ and each $X_B=X''_B+(105)$ and at the same (105) it applies to the reflection of FIGS. 54 and 55 at $18_B$ and $50_S$ that each $X_S=X''_S+(105)$ and each $X_B=X''_B-(105)$.

Figure 56:
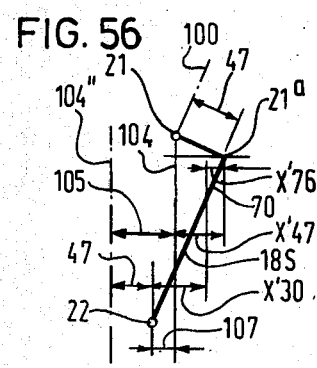
Figure 57:
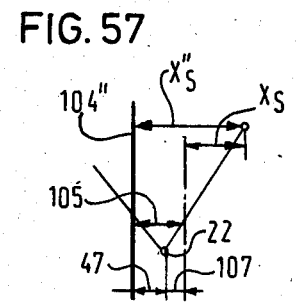

In the work situation of FIGS. 56 and 57, at $18_S$ and $50_S$, the aerial 21 is located on the S side of the pivotal point 22. Then $(105)=(47)+(107)$, wherein $(107)=(X'_{76}+X'_{30})-X'_{47}$. Each $X_S=X''_S-(105)$ and each $X_B=X''_B+(105)$ and at the same (105) it applies to the reflection of FIGS. 56 and 57 at $18_B$ and $50_B$, the aerial 21 being located on the B side of the pivotal point 22, that each $X_B=X''_B-(105)$ and each $X_S=X''_S+(105)$.

Figure 58:
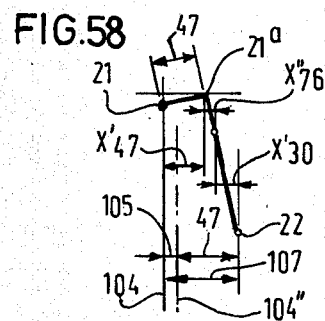
Figure 59:
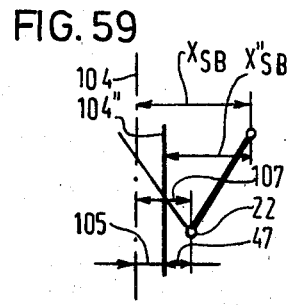

In the work situation of FIGS. 58 and 59, at $18_S$ and $50_B$, the aerial 21 is located between the pivotal point 22 and the plane 104. Then $(105)=(107)-(47)$, wherein $(107)=(X'_{76}+X'_{30})+X'_{47}$. Each $X_S=X''_S+(105)$ and each $X_B=X''_B-(105)$ and at the same (105) it applies to the reflection of FIGS. 58 and 59 at $18_B$ and $50_S$ that each $X_B=X''_B+(105)$ and each $X_S=X''_S-(105)$.

Since it would take much time in practice to anchor the cutting head suction dredger 1 by means of the anchoring pile 18 whilst at the instant of anchoring the aerial 21 is located in the plane 104 and at the predetermined $Z_{21}$ of the XYZ co-ordinate system attention is paid during the anchoring operation only to the $Z'$ co-ordinate being parallel to the Z co-ordinate. As shown in FIG. 60 this results in a real place of the aerial 21 spaced apart by a deviation $110_V$ in the Z direction and a deviation $108_B$ in the X direction from the place 131 of the aerial 21 assumed in FIG. 53. When the aerial 21 as in FIG. 62 is located at the right-hand side of the place 131 and behind the same, the X deviation is $108_B$ and the Z deviation becomes $110_V$ and in the opposite case $108_S$ and $110_A$ respectively.

$108_B$ results in $X_S+(108)$ and $X_B-(108)$,
$108_S$ results in $X_S-(108)$ and $X_B+(108)$,
$110_V$ results in $Z-(110)$,
$110_A$ results in $Z+(110)$.

FIGS. 61 to 68 show the consequences of the bending of the anchoring pile 18 for the place of the cutting head 6 in the ground by determining the correction terms 116 and 125 respectively in the $X'$ and $Z'$ directions. The negative pile position (FIGS. 62 and 64) in which the pivotal point 22 is nearer the cutting head 6 than the anchoring pile tilting point 23 and a positive pile position (FIGS. 61 and 63) in which the pivotal point 22 is further away from the cutting head 6 than the anchoring pile tilting point 23 are included in the calculation.

In FIGS. 61 to 64 the unloaded anchoring piles 18 are shown by broken lines and the anchoring piles 18 loaded by a horizontal force 120 by solid lines.

FIG. 65 shows a pile guide 148 comprising a guide sleeve 129 connected by means of an anchoring pile hinge 130 at the place of the anchoring pile tilting point 23 with the floating body 13 and a ring 121 surrounding the anchoring pile 18 and bearing on the guide sleeve 129 by means of four pressure pick-ups 128. The pick-ups 128 measure the components 117, 118, 119 and 122 respectively of the reactive pressure forces occurring in the directions to the rear, to the front, to a side, to port and starboard sides respectively. At each recorded value of a component 117, 118, 119 and 122 the anchoring pile 18 bends to a known extent 116 rearwards, 116 forwards, $125_B$ and $125_S$ respectively. This extent is horizontally measured and is calculated from the pile length, the pile elasticity and the pile slope or it is empirically assessed, as the case may be, in dependence upon the frequency of component variations. For example, excessively rapid component variations are not taken into account.

Figure 67:
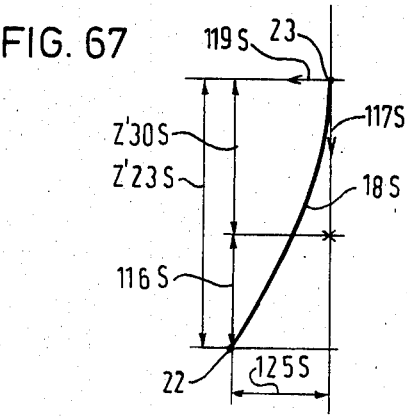

In FIGS. 61 and 67 it applies that $Z'_{23}=Z'_{30}+(116)$. This results in a variation of the arithmetic magnitudes 101 and 96 of FIGS. 26 to 42 and hence of $X''_{36}$ and $Z_{36}$.

Figure 68:
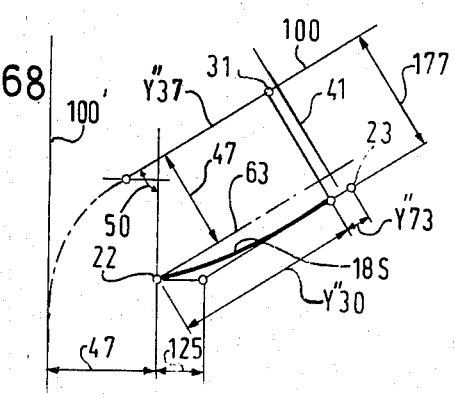

FIG. 68 is a rear view corrected for pile bending corresponding with FIG. 26 showing the correction value 125 for correcting the pile bending under the action of a component 119. During penetration of the anchoring pile 18 into the ground, it is still in the no-load condition so that the correction values 116 and 125 are nil and the pivotal point 22 is located at a distance 47 equal to the distance 177 of the plane 100', which is then identical to the plane 104''. The formula $(96)=((114)-(97) \sin (50))$ is after correction $(96)=((114)-(97) \sin (50)-(125))$. The formula $(101)=Z'_{30}+Z'_{73}+Z'_{37}+Z'_{69}$ is after correction: $(101)=Z'_{23}+Z'_{73}+Z'_{37}+Z'_{69}$, wherein $Z'_{23}=Z'_{30}+(116)$.

Due to pile bending the distance 47 between the aerial 21 and the point 21A (FIGS. 19a to 19e) varies so that in the formulae resulting from these FIGS. $(177)-(125) \cos (50)$ can be read instead of (47).

$Z'_{47}=((177)-(125) \cos (50)) \sin (79) \times \sin (38)$,
$Y''_{47}=((177)-(125) \cos (50)) \sin (79)$,
$Y_{47}=Y'_{47}=((177)-(125) \cos (50)) \sin (79) \times \cos (38)$,
$X'_{47}=((177)-(125) \cos (50)) \cos (79)$.

The following table indicates $Z'_{23}$ and the value of the distance 47:

in dependence upon the selected anchoring pile $18_S$ or $18_B$, in dependence upon the direction of the pile bending or in other terms in dependence upon the occurring two of the four components 117, 118, 119 and 122, and in dependence upon the positive or negative pile position.

| selected pile | signal | pile position | $Z'_{23}$ | 47 |
|---|---|---|---|---|
| $18_S$ | 119 | − | $Z'_{30} - (116)$ | $(117) - (125)\cos(50)$ |
|  |  | − | $Z'_{30} + (116)$ |  |
| $18_S$ | 122 | − | $Z'_{30} - (116)$ | $(117) + (125)\cos(50)$ |
|  |  | − | $Z'_{30} + (116)$ |  |
| $18_S$ | 119 | + | $Z'_{30} + (116)$ | $(117) - (125)\cos(50)$ |
|  |  | + | $Z'_{30} - (116)$ |  |
| $18_S$ | 122 | + | $Z'_{30} + (116)$ | $(117) + (125)\cos(50)$ |
|  |  | + | $Z'_{30} - (116)$ |  |

In the situation of the pile $18_B$ applies the reflection of the above table.

Figure 45:
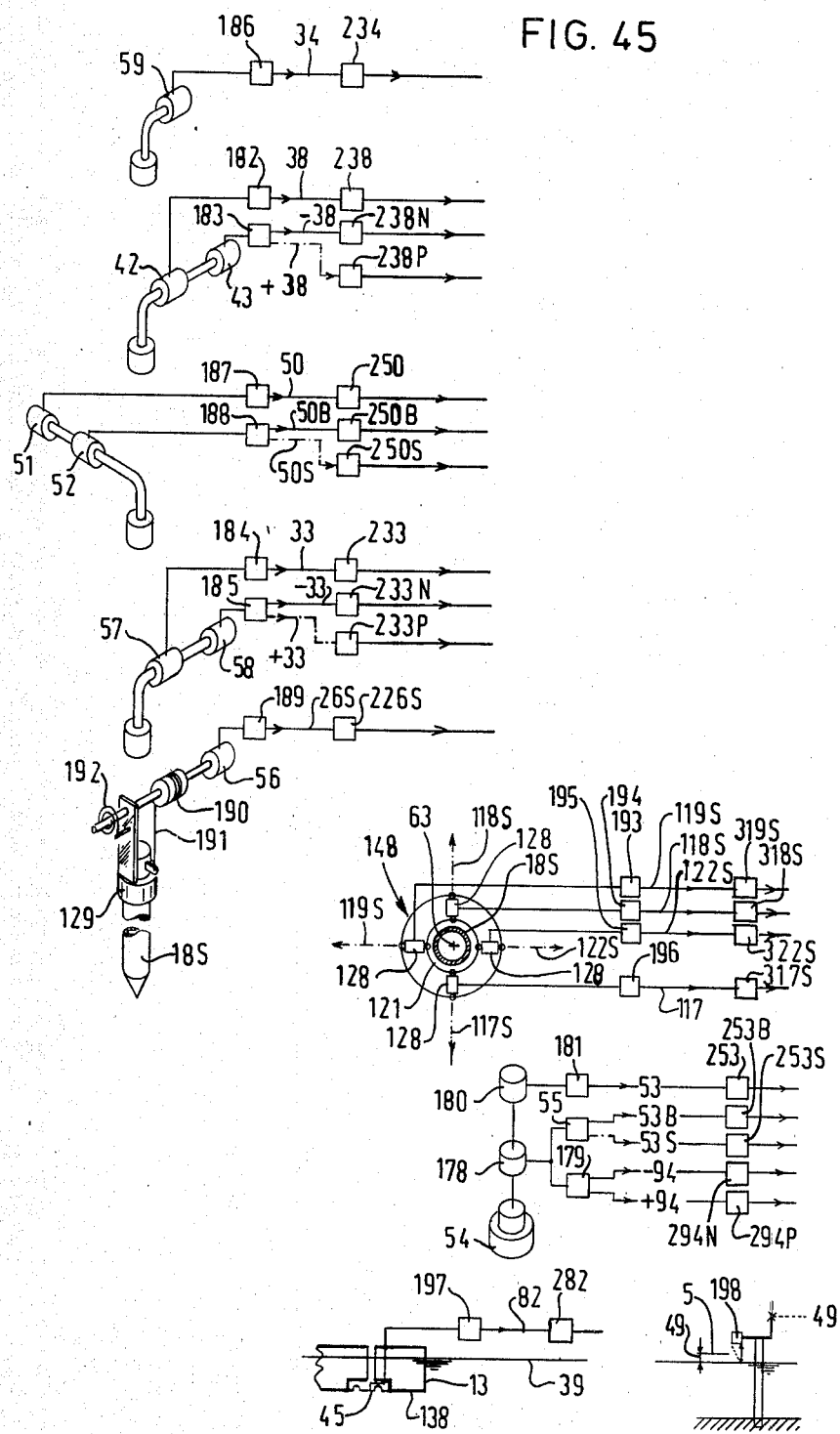
Figure 46:
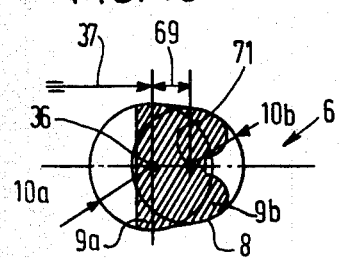
Figure 47:
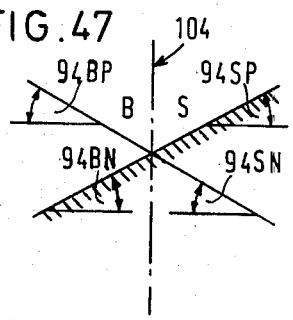
Figure 48:
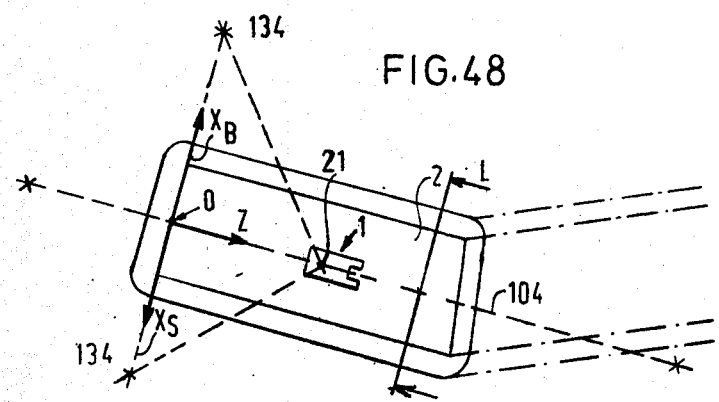

FIG. 45 shows a survey of the measuring value pick-ups mentioned hereinbelow and given by way of example for the cutting head suction dredger 1. A gyrocompass 54 arranged on the floating body 13 is coupled with a pulse producer 178, which is connected to a pulse-converting pick-up 179 for supplying a signal $+94$ or $-94$ relating to the sense of the talus angle 94 (FIG. 47) because in passing through the work plane 104 the sense of the talus angle 94 is inverted. The pulse producer 178 is, in addition, connected to a pulse-converting direction meter 55 for supplying a signal $53_S$ or $53_B$ relating to the sense of the swing angle 53. The gyrocompass 54 is furthermore coupled with a pulse producer 180, which is connected to a swing angle meter 181 converting pulses into signals corresponding to the swing angle 53. For measuring the pitch angles in the Z'Y' plane there are provided:

a pitch angle meter 42 with a converter 182 for supplying a signal corresponding to the pitch angle 38 of the floating body 13, a pitch angle sense scanner 43 with a converter 183 for supplying a signal indicating the +38 or −38 sense, for each anchoring pile 18 an anchoring pile angle meter 57 with a converter 184 for supplying a signal corresponding to the angle 33, for each anchoring pile 18 a sense scanner 58 with a converter 185 for supplying a signal indicating the +33 or −33 sense, a ladder angle meter 59 with a converter 186 for supplying a signal corresponding to the angle 34, a roll angle meter 51 mounted on the floating body 13 with a converter 187 for supplying a signal corresponding to the roll angle 50, and a roll angle sense meter 52 with a converter 188 for supplying a signal indicating the $50_S$ or $50_B$ sense.

If the construction of the cutting head suction dredger 1 as in this embodiment is such that the anchoring pile 18 and the ladder 14 occupy fixed positions relative to the floating body 13 in a transverse direction, it is preferred to use only one roll angle meter 51 and one roll angle direction meter 52.

For measuring the length 26 of each anchoring pile $18_S$ and $18_B$ upwards of the pivotal point 23 a length meter 56 with a converter 189 is provided for supplying a signal corresponding to the length 26. For this purpose the length meter 56 is coupled with a drum 190, around which is partly wound a wire 191 coupled with the pile 18. The wire 191 is wound on by means of a spring 192 connected with the guide sleeve 129.

The pressure pick-ups 128 of the pile guide 148 of each anchoring pile 18 comprise converters 193, 194, 195 and 196 supplying signals corresponding to the components 119, 118, 122 and 117 respectively in inward, forward, outward and rearward direction respectively.

The draught meter 45 is constructed in the form of a pressure pick-up measuring the local hydraulic pressure of the outboard water and being connected with a converter 197 supplying a signal corresponding to the draught 82 (FIG. 20a) of the draught meter 45.

A tide difference pick-up 198 standing on land measures the tide difference 49 between the water surface 39 and the starting level 5.

The fixed data such as the ship's dimensions and the variable measuring values assessed by the pick-ups of FIG. 45 serve for calculating the exact place of the point of intersection 11a or 11b of the cutting head 6 with respect to the pivotal point 22. The calculation of the co-ordinates of the points of intersection 11a and 11b is performed in an arithmetic device 150 once or many times a second as follows.

Figure 69:
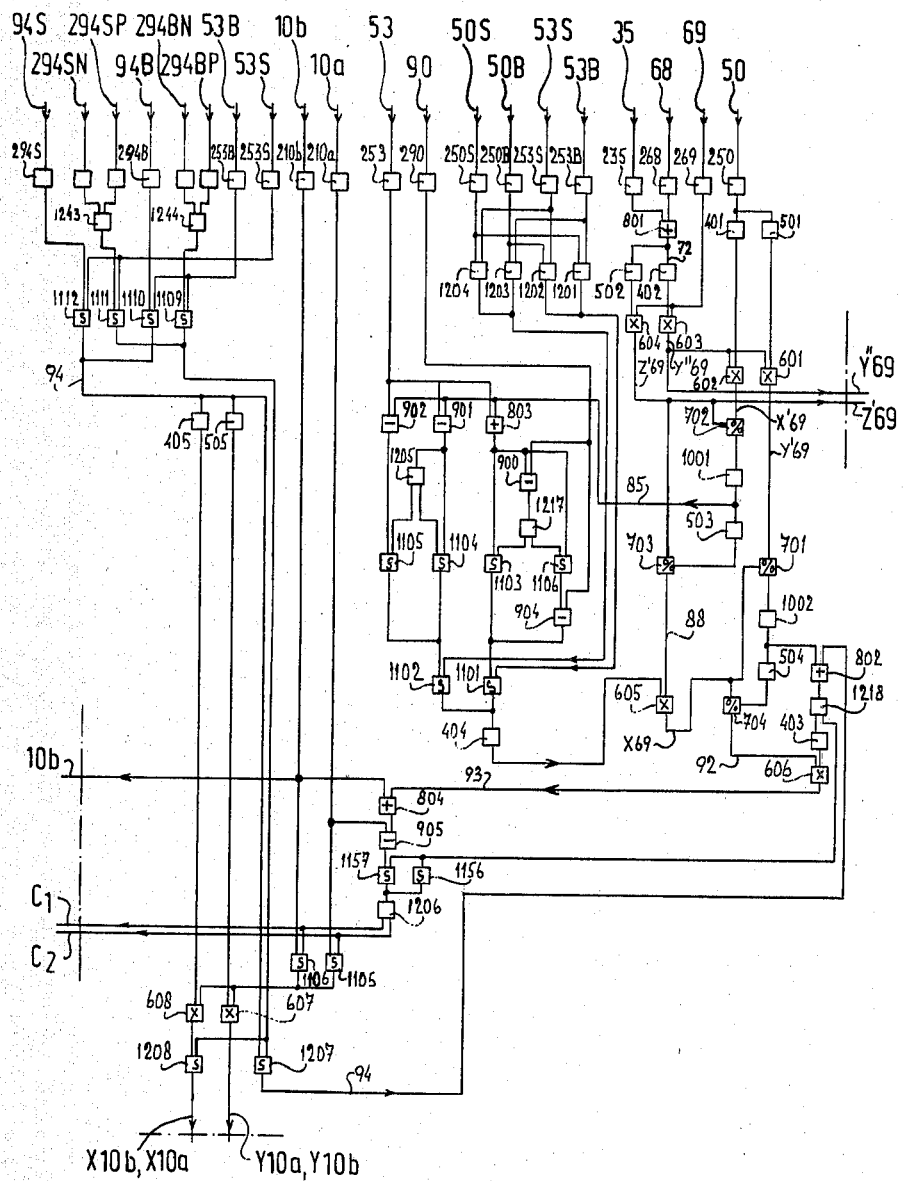

For each arithmetic cycle the measuring values of the converters are stored in the associated memory, the prior measuring value being erased. With the new measuring values the new co-ordinates of 11a and/or 11b are each time calculated. FIG. 69 shows that the roll angle 50 stored in a memory 250 is processed in a sine producer 401 and in a cosine producer 501. The output signals sin (50) and cos (50) are introduced into multipliers 602 and 601 respectively.

The fixed distance 69 between the centers 36 and 71 stored in a memory 269 is applied to multipliers 603 and 604. The ladder projection angle 68 calculated in a manner to be described hereinafter and stored in a memory 268 is applied to an adder 801. The fixed angle 35 between the cutting head axis 61 and the line of connection 236 of the ladder rotary point 31 and the first center 36 is stored in a memory 235, said angle 35 being combined in the adder 801 with the angle 68 to form the projection angle 72. The projection angle 72 is applied to a sine producer 402 and a cosine producer 502. The output signals sin (72) and cos (72) are fed to the multipliers 603 and 604 respectively. The output signal of the multiplier 603 is (69) sin (72)=$Y''_{69}$ and is fed to the multipliers 601 and 602. The output signal of the multiplier 601 (69) sin (72)×cos (50)=$Y'_{69}$ is applied as a numerator to the divider 701. The output signal of the multiplier 602 (69) sin (72)×sin (50)=$X'_{69}$ is applied as a numerator to the divider 702. The product (69) cos (72)=$Z'_{69}$ from multiplier 604 is applied as a denominator to divider 702 and as a numerator to divider 703.

Figure 23:
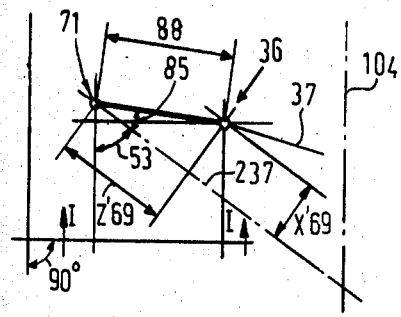
Figure 23:
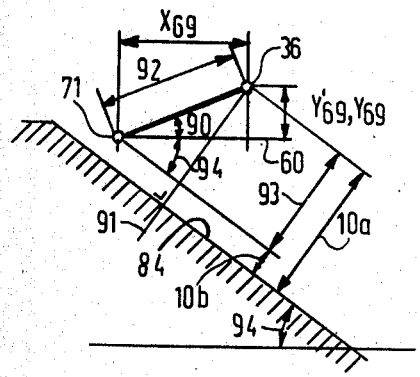

The output signal tan (85) of divider 702 is converted in the angle producer 1001 into the angle 85. The angle 85 is applied to cosine producer 503, the output signal of which cos (85) is applied as a donominator to divider 703. The output signal (69) cos (72)/cos (85)=projection (88) (see FIG. 23) is applied to a multiplier 605, to which is also applied the signal sin ((53)+(85)) of FIG. 25, which emanates from the sine producer 404 to be described hereinafter. The product of multiplier 605 $X_{69}$=(88) sin ((53)+(85)) is applied as a numerator to divider 704 and as a denominator to divider 701. The quotient tan (90) of divider 701 is applied to the angle producer 1002, the output angle 90 of which is applied to an adder 802 and a cosine producer 504. To the adder 802 is also applied the talus angle 94 with a + or − sign from the sign producer 1207 to be described hereinafter. The sum ((90)+(94)) of the adder 802 is fed to the sense scanner 1218 supplying a positive signal to the sine producer 403, the output of which is applied to multiplier 606.

Only a negative signal from adder 802 fed to the sense scanner 1218 is applied therefrom as a positive signal to switches 1156 and 1157, which are thus closed and opened respectively.

The output signal of cosine producer 504 is applied as a denominator to divider 704, the output (92)=$X_{69}$/cos (90) is applied to multiplier 606. The output thereof (93)=(92) sin ((90)+(94)) is applied to adder 804.

For a clear recognition the parts of the arithmetic device 150 are referenced as follows:
memories by 200 series numerals,
sine producers by 400 series numerals,
cosine producers by 500 series numerals,
multipliers by 600 series numerals,
dividers by 700 series numerals,
adders by 800 series numerals,
subtractors by 900 series numerals,
angle producers by 1000 series numeral,
switches by 1100 series numerals,
sign producers, scanners by 1200 series numerals,
tangent producers by 1300 series numerals.

It should be noted that the divider 704 becomes only operative when its two inputs receive a signal. For that matter, this also applies to all arithmetic elements such as adders, subtractors, multipliers, dividers, sign producers and switches.

The signal $50_S$ or $50_B$ relating to the direction of the roll angle 50 is applied to memory $250_S$ and $250_B$ respectively. Likewise the signal $53_S$ or $53_B$ is applied to memory $253_S$ and $253_B$ respectively.

The memory $250_B$ is connected to sign producers 1202 and 1203, the memory $250_S$ is connected to sign producers 1201 and 1204, the memory $253_S$ is connected to sign producers 1202 and 1204 and the memory $253_B$ is connected to sign producers 1201 and 1203. The sign producers 1201 to 1204 supply a sign signal, if they receive a signal at both their inputs i.e. 1201 and 1202 to switch 1101 and 1203 and 1204 to switch 1102.

The measuring value of the swing angle 53 is applied from the swing angle meter 181 to memory 253, from where it goes to an adder 803 and subtractors 901 and 902, each of which receives in addition a signal angle 85 from an angle producer 1001. For each situation of FIGS. 25a to 25h, in order to calculate the distance $X_{69}$ (FIG. 23a), the angle 85 is algebraically added to the swing angle 53. For this purpose the adder 803 is connected to switches 1106 and 1103 and to a subtractor 900. The output of subtractor 901 is the signal (53)−(85), the output of subtractor 902 is the signal (85)−(53) and the output of adder 803 is the signal (53)+(85). In the subtractor 900 receiving the signal 90 from the memory 290 the difference (90)−((53)+(85)) is calculated. At a positive result the sign producer 1217 closes switch 1103 and opens switch 1106 so that the signal (53)+(85) is passed to switch 1101, whereas at a negative result the switch 1103 is opened and the switch 1106 is closed, so that the signal (53)+(85) is introduced into the subtractor 904 receiving a signal 90 from the memory 290. The result (90)−((53)+(85)) is applied to switch 1101. The sign producer 1205 responding to subtractor 901 closes switch 1104 at a positive result of subtractor 901 and opens switch 1105, whereas at a negative result it opens switch 1104 and closes switch 1105. The switches 1104 and 1105 are connected to the input of switch 1102.

If switch 1101 also receives a signal from sign producer 1201 or 1202, this switch 1101 passes the signal received from adder 803 to sine producer 404. If switch 1102 also receives a signal from sign producer 1203 or 1204, this switch 1102 passes the signal received from subtractor 902 or 901 to sine producer 404, the output signal of which is applied to multiplier 605.

Figure 72:
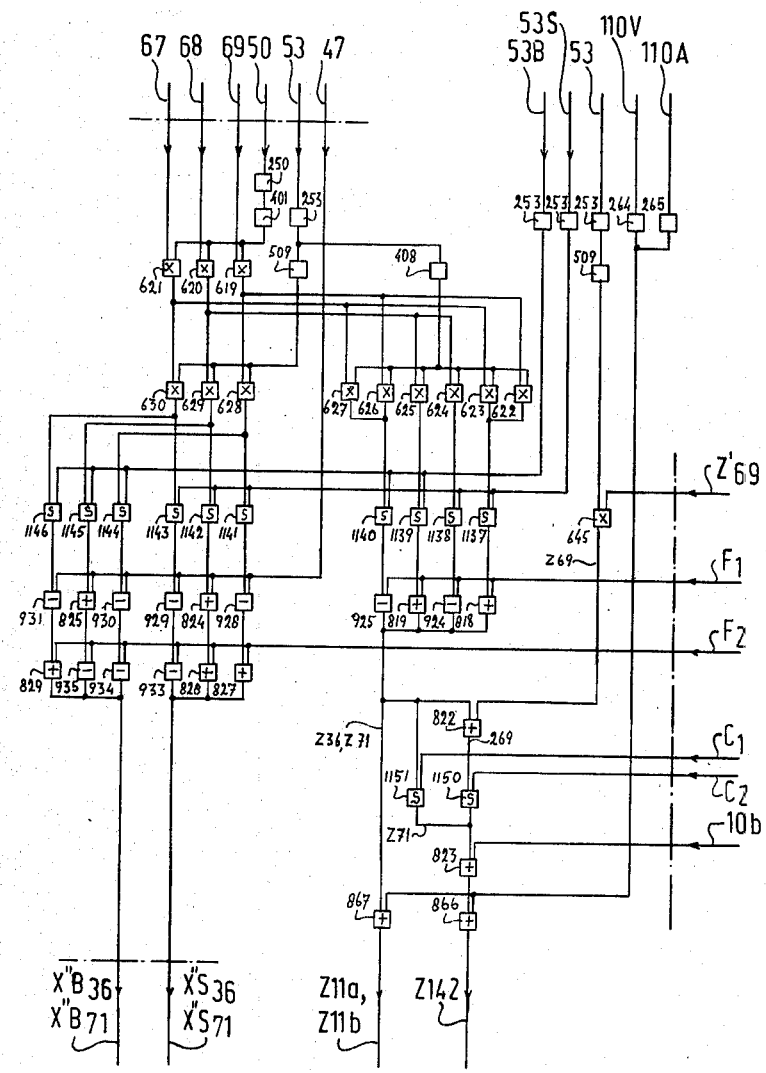

In order to determine which of the spherical parts 9a and 9b is cutting, the following part of the calculation is performed. In the memories 210a and 210b are recorded the spherical radii 10a and 10b respectively. The spherical radius 10a is applied to switch 1105 and subtractor 905 and the spherical radius 10b to switch 1106 and adders 804 and 823 (FIG. 72). In adder 804 the signal 93 from multiplier 606 is raised with the spherical radius 10b. The output signal of adder 804 (10b)+(93) is subtracted in subtractor 905 from the spherical radius 10a. The spherical part 9a is in any case cutting so that the result (90)−(94) of adder 802 is negative. To this end switch 1156 is closed and switch 1157 is opened and sign scanner 1206 receives the positive signal from sign scanner converter 1218. If the result (90)−(94) is positive, spherical part 9a can nevertheless be cutting, that is to say, when the difference scanned in sign producer 1206 (10a)−((10b)+(93)) of subtractor 905 is positive. To this end, while switch 1157 is closed and switch 1156 is open, the signal from subtractor 905 is passed to sign scanner 1206, which closes switch 1105 and opens switch 1106 at a positive signal from subtractor 905 as well as at a positive signal from converter 1218 so that signal (10a) is passed to multipliers 607 and 608. If the sign scanner 1206 does not receive a positive signal, it opens the switch 1105 and closes switch 1106 as a result of which signal (10b) is passed to multipliers 607 and 608.

Figure 24:
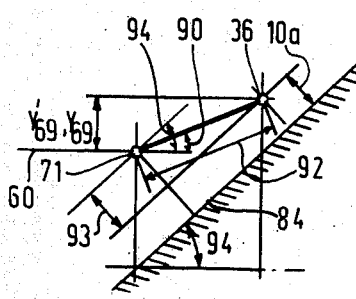
Figure 24:
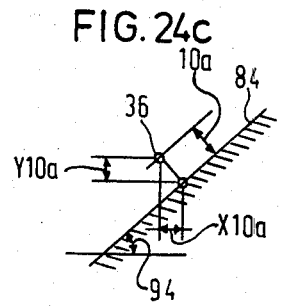
Figure 24:
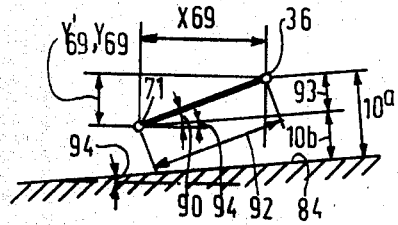
Figure 28:
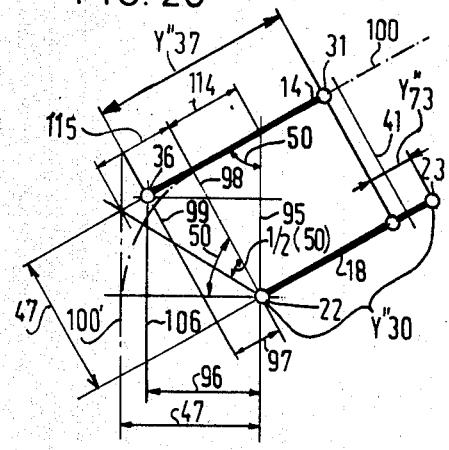
Figure 43:
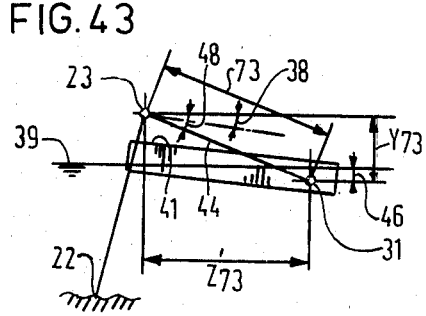
Figure 44:
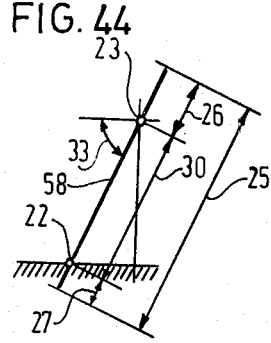
Figure 70:
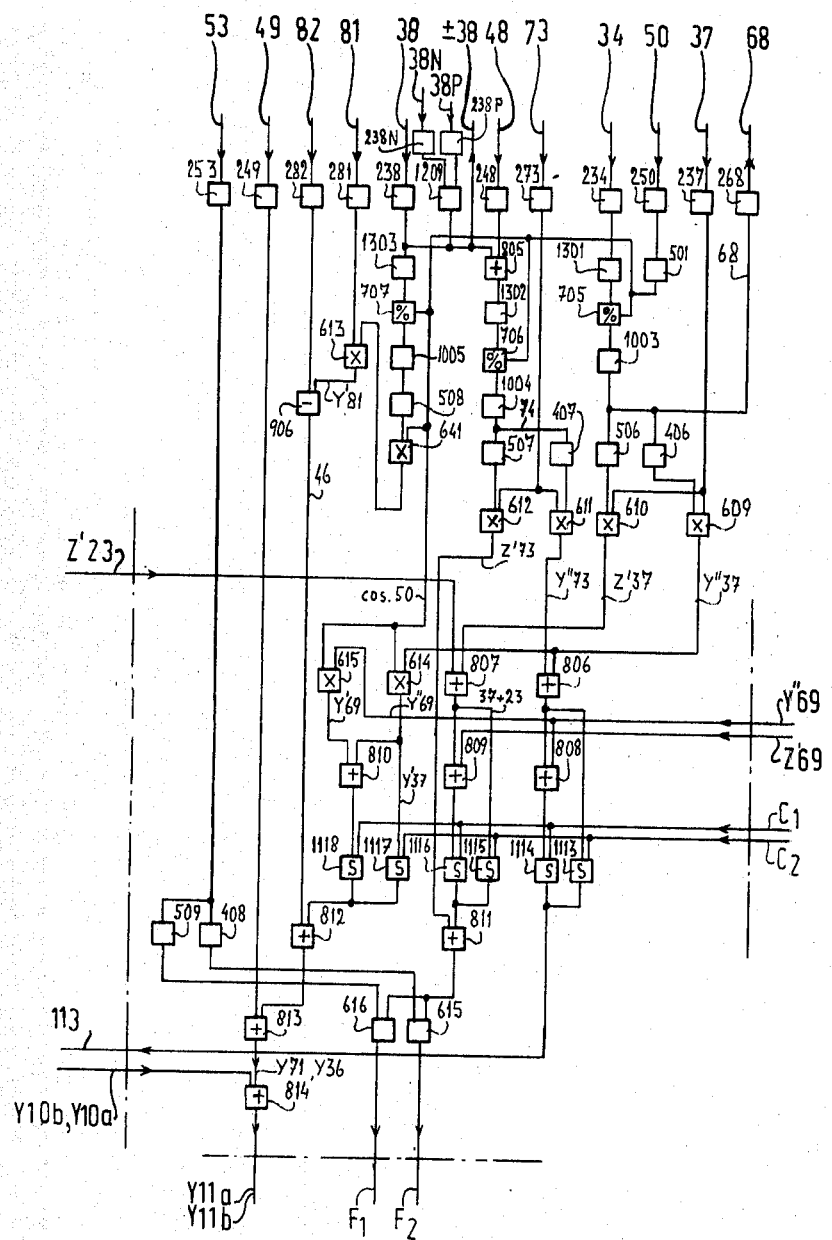
Figure 73:
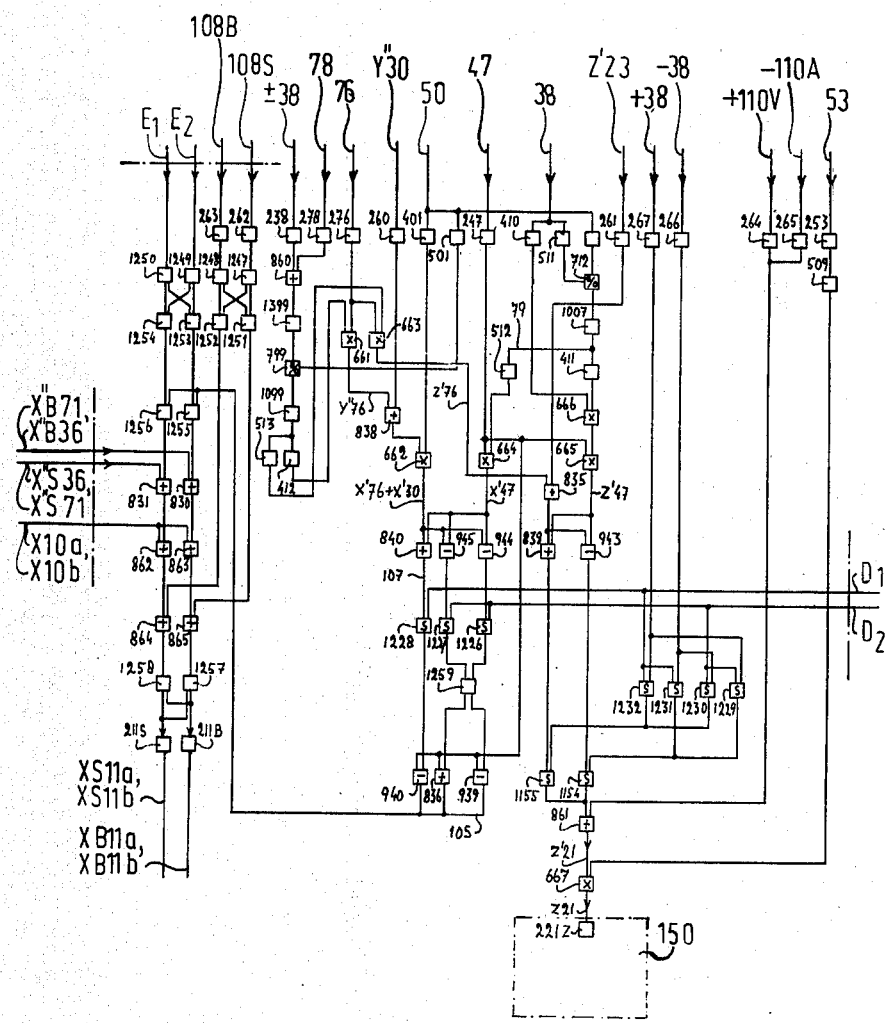
Figure 74:
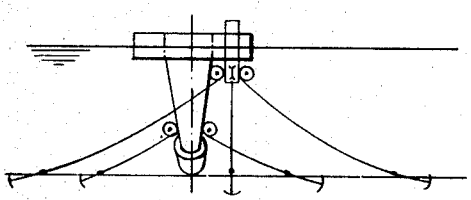
Figure 75:
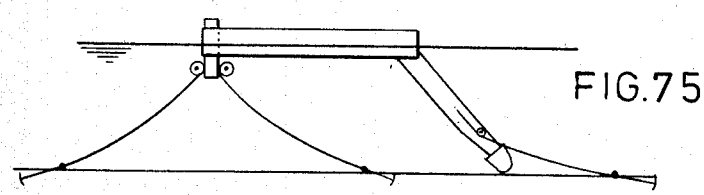

The profile of the work 2 (see FIGS. 23, 24, 47 and 69) is included in the calculation in order to assess which intersecting point of the cutting envelope 8 of the cutting head 6 is first to touch the talus. For each talus the angles of inclination $94_B$ and $94_S$ for port and starboard sides are stored in the memories $294_B$ and $294_S$ respectively and the senses + or − of these angles of inclination (FIG. 47) are stored in the memories $294_N$ and $294_P$ respectively. Furthermore the instantaneous direction of the swing angles $53_B$ and $53_S$ is stored in the memories $253_B$ and $253_S$ respectively, which are connected to switches 1109 and 1110, 1111 and 1112 respectively. The memories $294_{SN}$, $294_{SP}$, $294_{BN}$ and $294_{BP}$ respectively are connected to sign producers 1243 and 1244 respectively. Sign producer 1243 passes the signal + or − to switch 1111, whereas sign producer 1244 passes said signal to switch 1109. The memories $294_B$ and $294_S$ are each connected to a switch 1110 and 1112 respectively. The outputs of switches 1109 and 1111 are passed to sign producers 1207 and 1208 and the outputs with signal 94 of switches 1110 and 1112 are passed to sign producer 405, cosine producer 505 and sign producer 1207. The output of sine producer 405 is applied to multiplier 608, the output of cosine producer 505 to multiplier 607 and the output of multiplier 608 to sign producer 1208, the output signal of which $X_{10a}=\pm(-10a)\sin(94)$ or $X_{10b}=\pm(10b)\sin(94)$ (FIG. 24c) is applied to adders 862 and 863 (FIG. 73). The output signal of multiplier 607 (10a) cos (94) or (10b) cos (94) is applied to adder 814 (FIG. 70). In the memory 237 (FIG. 70) is stored the fixed distance 37 of the ladder rotary point 31 from the first center 36 (FIGS. 3 and 14). The signal 34 from converter 186 relating to the ladder angle 34 is introduced into memory 234. The fixed distance 73 along the line 44 between the anchoring pile tilting point 23 and the ladder rotary point 31 (FIGS. 3, 17 and 43) is stored in memory 273. The fixed angle 48 between the line 44 and the horizontal deck 41 is stored in memory 248. The + or − signal from converter 183 relating to the direction of the pitch angle 38 determined by the pitch angle direction meter 43 is stored in memory 202. The fixed distance 81 between the ladder rotary point 31 and the plane 138 going through the draught meter 20a (FIG. 45) is stored in memory 281. The signal 82 from converter 197 relating to the draught 82 of the plane 138 below the water line 39 measured by the draught meter 45 is stored in memory 282. The signal 49 from the tide difference meter 198 relating to the tide difference 49 is stored in memory 249. The signal 37 of memory 237 is passed to multipliers 610 and 609. The signal 50 of memory 250 is passed to cosine producer 501, the output cos (50) of which is passed as a denominator to the dividers 705, 706, 707 and 708. The signal 34 of memory 234 is passed to tangent producer 1301, the output of which tan (34) is passed as a numerator to the divider 705. The output signal tan (68) (FIG. 14) is passed to the angle producer 1003, the output angle 68 of which is passed to a memory 268 (FIG. 69), a sine producer 406 and a cosine producer 506. The output signal cos (68) of cosine producer 506 is multiplied in multiplier 610 by the signal 37 of memory 237 in order to obtain $Z'_{37}=(37)\cos(68)$, this value being passed to adder 807. The output signal sin (68) of sine producer 406 is passed to multiplier 609 and is multiplied by the signal 37 from the memory 237 in order to calculate $Y''_{37} = (37) \sin (68)$. The output signal $Y''_{37}$ is applied to adder 806 and multiplier 614.

The signal 73 of memory 273 (FIG. 17) is applied to multipliers 611 and 612. The signal 48 of memory 248 is applied to adder 805. The signal 38 of memory 238 is passed to tangent producer 1303 and to sign producer 1209, which receives the signal $-38$ from memory $238_N$ and the signal $+38$ from memory $238_P$ respectively. The signal of sign producer $1209 \pm (38)$ is passed to adder 805 and to memory 238 (FIG. 73), the output signal of which $(48) \pm (38)$ is applied to tangent producer 1302. The output signal of tangent producer 1302 is passed as a numerator to divider 706. The output signal $$\tan(74) = \frac{\tan(48) \pm (38)}{\cos(50)}$$

is passed to angle producer 1004, the output signal of which: angle 74 is passed to cosine producer 507 and sine producer 407. The output signal $\cos (74)$ of cosine producer 507 is passed to multiplier 612. The product $(73) \cos (74) = Z'_{73}$ is passed to adder 811. The output signal $\sin (74)$ of sine producer 407 is passed to multiplier 611. The product $Y''_{73} = (73) \sin (74)$ is passed to adder 806.

The output signal $\tan (38)$ of tangent producer 1303 is passed as a numerator to divider 707 receiving as a denominator the signal $\cos (50)$ from cosine producer 501. The quotient $\tan (80)$ is passed to angle producer 1005, the output signal of which: angle 80 is passed to cosine producer 508. The output signal $\cos (80)$ is multiplied in multiplier 641 by the signal $\cos (50)$ from cosine producer 501. The product $\cos (80) \times \cos (50)$ is passed to multiplier 613 for multiplication by signal 81 from memory 281 in order to obtain $Y'_{81} = (81) \cos (80) \cos (50)$, which value is passed to subtractor 906 to reduce the signal 82 from memory 282. The output signal $(46) = (82) - Y'_{81}$ of subtractor 906 is passed to adder 812.

The output signal $Y''_{37} + Y''_{73}$ of adder 806 is passed to adder 808 and switch 1113. To adder 808 is applied signal $Y''_{69}$ from multiplier 603 (FIG. 69). The output signal $Y''_{37} + Y''_{73} + Y''_{69}$ of adder 808 is passed to switch 1114. In the adder 807 is added to the $Z'_{37}$ the value $Z'_{23}$ (FIGS. 67 and 71) in a manner to be described hereinafter. The sum $Z'_{23} + Z'_{37}$ is passed to switch 1115 and adder 809 for adding by the signal $Z'_{69}$ emanating from multiplier 604 (FIG. 69). The sum $Z'_{23} + Z'_{37} + Z'_{69}$ is passed to switch 1116. In multiplier 614 the signal $Y''_{37}$ is multiplied by the signal $\cos (50)$ from cosine producer 501. The output signal $Y'_{37} = Y''_{37} \cos (50)$ is applied to switch 1117 and adder 810. In multiplier 615 the signal $Y''_{69}$ is multiplied by signal $\cos (50)$ from cosine producer 501. The resultant product goes to adder 810. When the sign producer 1206 (FIG. 69) assesses a positive signal from subtractor 905, this means that the spherical part $9a$ is cutting, whilst the output signal of sign producer 1206 closes switch 1113 and opens switch 1114 so that the signal $Y'''_{37} + Y''_{73}$ from switch 1113 is passed to subtractors 910 and 911 (FIG. 71), whereas in the event of a negative signal from subtractor 905 the signal from sign producer 1206 closes switch 1114 and opens switch 1113 for passing signal $Y''_{37} + Y''_{73} + Y''_{69}$ from adder 808 to subtractors 910 and 911. In the event of a positive signal from subtractor 905 the signal from sign producer 1206 closes, in addition, switch 1115 and opens switch 1116 for passing the signal $Z'_{37} + Z'_{23}$ from adder 807 to adder 811, whereas in the event of a negative signal switch 1116 is closed and switch 1115 is opened for transferring the signal $Z'_{37} + Z'_{23} + Z'_{69}$ to adder 811. The output signal $(101) = Z'_{73} + Z'_{37} + Z'_{23} + Z'_{69}$ or $(101) = Z'_{73} + Z'_{37} + Z'_{23}$ from adder 811 is passed to multipliers 615 and 616, in which it is multiplied by the signal $\sin (53)$ or $\cos (53)$ respectively emanating from sine producer 408 or cosine producer 509 respectively, the inputs of which are connected to memory 253, which receives the signal 53 of the converter 181 of the swing angle pulse producer 180. The output signal (101) $\sin (53)$ of multiplier 615 is passed to adders 827, 828 and 829 and the subtractors 933, 934 and 935 (FIG. 72). The output signal (101) $\cos (53)$ from multiplier 616 is passed to the adders 818 and 819 and the subtractors 924 and 925 (FIG. 72). The output signal $Y'_{37} + Y'_{69}$ or $Y'_{37}$ from switch 1118 or 1117 respectively is passed to adder 812 to be raised by signal 46 from subtractor 906. The output put signal of adder 812 is passed to adder 813 as well as the signal 49 from memory 249. The sum $Y_{71} = Y'_{71} = Y'_{37} + Y'_{69} + (46) + (49)$ or $Y_{36} = Y'_{36} = Y'_{37} + (46) + (49)$ from adder 813 passes to adder 814, in which the output signal $Y_{10a} = (10a) \cos (94)$ or $Y_{10b} = (10b) \cos (94)$ from multiplier 607 (FIG. 69) is added for obtaining the Y co-ordinate $Y_{11a}$ or $Y_{11b}$ of the point of intersection $11a$ or $11b$ respectively (see FIG. 24c).

Figure 71:
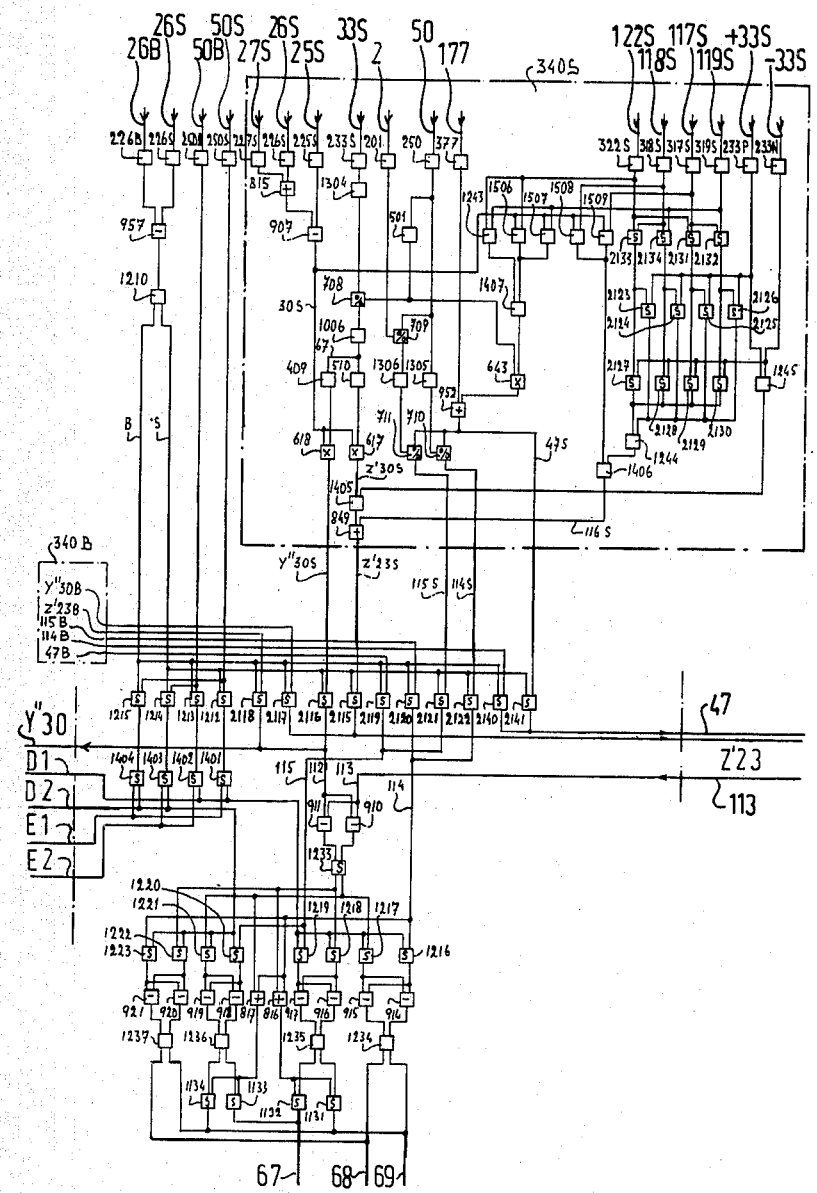

In order to be able to select the position concerned of the cutting head suction dredger 1 from the recorded measuring values among the potential positions of FIGS. 26 to 33 the part of the arithmetic device 150 described with reference to FIG. 71 is employed. The distances $26_S$ and $26_B$ of the piles $18_S$ and $18_B$ are constantly recorded by means of anchoring pile length pick-ups $56_S$ and $56_B$, whose converters $189_S$ and $189_B$ are connected to memories $226_S$ and $226_B$ (FIG. 71). In order to be able to state whether anchoring pile $18_S$ or anchoring pile $18_B$ determines the pivotal point 22, the signal $26_B$ is subtracted from the signal $26_S$ in subtractor 957. In the sign scanner 1210 it is assessed whether this result is positive or negative, that is to say, whether pile $18_S$ or pile $18_B$ starts from the pivotal point 22 and it is ensured that the positive output of subtractor 957 energizes via sign scanner 1210 the switches 1212 and 1214 and the negative output energizes the switches 1213 and 1215.

The signal $50_S$ or $50_B$ of the transverse trim angle 50 stored in memories $250_S$ or $250_B$ respectively is passed to switches 1212 and 1215 or switches 1213 and 1214 respectively.

The one switch of the switches 1212, 1213, 1214 and 1215 that receives two signals closes a switch 1401, 1402, 1403 and 1404 respectively, the switches 1401 and 1402 passing a first signal to signal scanners 1216, 1217, 1218 and 1219 and, in addition, to switch 1228 and to sign converters 1231 and 1232 (FIG. 73) and the switches 1403 and 1404 passing a first signal to switches 1220, 1221, 1222 and 1223 and, in addition, to switches 1226 and 1227 and to sign converters 1229 and 1230 (FIG. 73).

When signal scanner 1219 receives a signal, this means that pile $18_S$ is operating at a slope $50_S$ or that pile $18_B$ is operating at a slope $50_B$. When the signal scanner 1220 receives a signal this means that pile $18_S$ is operative at a slope $50_B$ or that pile $18_B$ is operative at a slope $50_S$.

In memory $227_S$ is set a value $27_S$ according to the estimated length 27 of pile $18_S$ in the ground 12 (FIG. 3). If a dish 28 is employed, this value $27_S$ is nil. The output signal $27_S$ of memory $227_S$ is passed to adder 815. The measuring value of the length $26_S$ of the top end of pile $18_S$ (FIG. 3) stored in memory $226_S$ is passed to adder 815, the output of which is applied to subtractor 907 and to memories 1506, 1507, 1508 and 1509. The anchoring pile length $25_S$ stored in memory $226_S$ is passed to subtractor 907 for calculating the operative length $30_S = (25_S) - ((27) + (26))$. The output of the subtractor 907 is passed to multipliers 617 and 618. The measured angle of inclination of the pile $33_S$ stored in memory $233_S$ is passed to a tangent producer 1304. The output tan $(233_S)$ is passed as a numerator to divider 708, which receives as a denominator the signal cos (50) from cosine producer 501 and which provides the output tan $(67_S)$ (FIGS. 13a to 13e). The signal tan $(67_S)$ is converted in angle producer 1006 into an angle $67_S$, which is passed to cosine producer 510 and to sine producer 409. The signal sin $(67_S)$ from sine producer 409 is passed to multipliers 618, the output of which $(30_S)$ sin $(67) = Y''_{30S}$ is passed to a switch 2116. The signal cos (67) from cosine producer 510 is passed to multiplier 617, the output of which $Z'_{30S} = (30_S)$ cos $(67_S)$ is applied to a sign producer 1405, which receives a positive or negative signal from a signal scanner 1245, which is connected to the memories $233_P$ and $233_N$. One of these two memories has received a positive or negative signal respectively from converter 185 of the pile direction meter 58. The output signal $\pm Z'_{30S}$ of sign producer 1405 is passed to adder 849, which receives, in addition, a signal $+116_S$ or $-116_S$ from the sign producer 1406 to be described hereinafter. The sum $Z'_{23S} = (\pm 116_S) + (+Z'_{30S})$ (see FIG. 67) from adder 849 passes to switch 2115.

The tangent producer 1305 connected to the memory 250 of the transverse trim angle 50 has an output tan (50), which is passed as a denominator to divider 710, which receives the signal $47_S$ as a numerator from the adder 952 to be described hereinafter (FIG. 68). The quotient $114_S = 47_S/\tan (50)$ of the divider 710 is passed to switch 2122.

The signal 50 is applied as a numerator to divider 709, which receives as a denominator a fixed value = 2 from memory 201. The quotient 50/2 is converted in tangent producer 1306 into tan ½(50). The signal tan ½(50) is passed as a denominator to divider 711, which receives as a numerator the signal $47_S$ from adder 952. The quotient $115_S = (47_S)/\tan \frac{1}{2}(50)$ is passed to switch 2121.

For correcting the pile bending the following calculation is carried out. The measuring values $117_S$, $118_S$, $119_S$ and $122_S$ of the pressure pick-ups 128 stored in memories $317_S$, $318_S$, $319_S$ and $322_S$ respectively are passed to switches 2131 and 2132, switches 2134 and 2133, switches 2132 and 2134 and switches 2131 and 2133 respectively and to converters 1509, 1508, 1507 and 1506 respectively. The measuring values $122_S$ and $119_S$ are converted in said converters into correction values $125_S$ and $116_S$ and calculated relatively to the pile bending, since in each of the converters 1506, 1507, 1508 and 1509 the empirically assessed relationship is recorded between the operative pile length $30_S$ and the recorded measuring value $122_S$, $119_S$, $118_S$ and $117_S$ respectively on the one hand and the actual pile bendings $125_S$, $125_S$, $116_S$ and $116_S$ respectively on the other hand. This pile bending comprises the correction for the play between the pile 18 and the pile guide 148, in that said play is automatically taken into account at the empirically assessed relationship. The memories $319_S$ and $322_S$ are, in addition, connected to the negative and positive input respectively of a sign scanner 1243, which then passes the sign concerned to the sign producer 1407, which receives the correction value $125_S$ from converters 1506 and 1507. The signal $\pm 125_S$ is applied to multiplier 643 for multiplication by the signal cos (50) from cosine producer 501. The product $(\pm 125_S)$ cos (50) is applied to adder 952 as well as the signal relating to the fixed value 177 (FIG. 68) from memory 377. The sum $(47_S) = (177) \pm (125_S)$ cos (50) is passed to a switch 2141 and as a numerator to the dividers 710 and 711. The signal $116_S$ from converters 1509 or 1508 is applied to sign producer 1406. The outputs of the switches 2133, 2134, 2131 and 2132 are passed to switches 2123 and 2127, 2124 and 2128, 2125 and 2129 and 2126 and 2130 respectively.

The switches 2123, 2124, 2125 and 2126 connected to the positive input of sign scanner 1244 and having a positive output signal receive a signal from memory $233_P$, whereas the switches 2127, 2128, 2129 and 2130 connected to the negative input of sign scanner 1244 receive a signal from memory $233_N$. The sign producer 406 passes the sign received from sign scanner 1244 to a signal $116_S$ and passes the signal $\pm 116_S$ onto adder 849. The memories $233_P$ and $233_N$ are, moreover, connected to the positive and negative inputs respectively of sign scanner 1245, the output signal of which is passed to sign producer 1405.

The arithmetic elements described above included in the arithmetic unit $340_S$ with the five outputs $Y''_{30S}$, $Z'_{23S}$, $115_S$, $114_S$ and $47_S$ connected to switches 2116, 2115, 2121, 2122 and 2141 respectively apply to the pile $18_S$. Corresponding arithmetic elements are provided in an arithmetic unit $340_B$, the outputs of which $Y''_{30B}$, $Z'_{23B}$, $115_B$, $114_B$ and $47_B$ respectively are connected to switches 2118, 2117, 2119, 2120 and 2140 respectively. The positive output of sign producer 1210 is, moreover, connected to switches 2116, 2115, 2121, 2122 and 2141 respectively for indicating that the pile $18_B$ is operative. The negative output of sign producer 1210 is furthermore connected to switches 2118, 2117, 2119, 2120 and 2140 to indicate that the pile $18_S$ is operative and that in this case the arithmetic unit $340_S$ has to be connected.

In order to assess the work situation of the cutting head suction dredger 1 among the possibilities of FIGS. 26 to 33 the following part of the calculation for (96)/sin (50) is used.

The output signals from the switches 1401 and 1402 are indicative of the situations $18_S$ with $50_S$ and respectively of $18_B$ with $50_B$. Likewise the output signals from the switches 1403 and 1404 are indicative of the situations $18_S$ with $50_B$ and respectively $18_B$ with $50_S$. In order to assess whether $(113) - (112)$ or $(112) - (113)$ is positive, the signals 112 and 113 are fed to subtractors 911 and 910 respectively, the signal scanner 1233 passing only the positive signal thereof to switches 1218, 1222 and to adder 816 and, respectively, to switches 1217, 1221 and to adder 817.

The signal 114 from switches 2120 or 2122 is passed to switches 1216 and 1223 and to adders 816 and 817. The signal 115 from switches 2119 or 2121 is passed to switches 1219 and 1220. In order to assess whether $(114) - ((112) - (113))$ or $((112) - (113)) - (114)$ from the subtractors 914 and 915 respectively is positive, these difference signals are applied to the signal scanner 1234, which transmits only the positive signal to the multipliers 619 and 620 respectively of FIG. 72. In order to assess whether $(115)-((113)-(112))$ or $((113)-(112))-(115)$ is positive, only the positive signal of the difference signals from the subtractors 916 and 917 respectively is passed on by the signal scanner 1235 to switches 1131 and 1132 respectively. The signal from adder 816 is passed to switches 1131 and 1132. When one of the two switches 1131 and 1132 receives two signals it passes on the signal $(114)+((113)-(112))$ to the multipliers 619 and 621 respectively (FIG. 72). In order to assess whether $((112)-(113))-(115)$ or $(115)-((112)-(113))$ is positive, these signals from the subtractors 918 and 919 respectively are applied to a signal scanner 1236, which passes only the positive signal to the switches 1133 and 1134 respectively. The sum $(114)+((112)-(113))$ from the adder 817 is passed by the switches 1133 or 1134 to the multipliers 621 and 619 respectively of FIG. 72, if one of these two switches receives a second signal. In order to assess whether $(114)-((113)-(112))$ or $((113)-(112))-(114)$ is positive, these signals from the subtractors 920 and 921 respectively are applied to a signal scanner 1237, which passes only the positive signal to the multipliers 619 and 620 respectively of FIG. 72. If the signal from the subtractors 914, 915, 916, 917, 918, 919, 920 or 921 is positive, the work situation of FIGS. 26, 27, 28, 29, 30, 31, 32 and 33 respectively exists.

For calculating the measure 96 (FIG. 72) the signal sin(50) from sine producer 401 is applied to multipliers 619, 620 and 621. The product 96 from multipliers 619, 620 and 621 is passed to multipliers 628, 626, and 622, the multipliers 629, 625 and 624 and respectively, the multipliers 630, 627 and 623. Moreover, the multipliers 628, 629 and 630 receive the signal cos(53) from cosine producer 509. Moreover, the multipliers 622, 623, 624, 625, 626 and 627 receive the signal sin(53) from sine producer 408.

The product from the multipliers 622 and 623 is passed to switch 1137, the product from multiplier 624 to switch 1138, the product from multiplier 625 to switch 1139, the product from multipliers 626 and 627 to switch 1140, the product from multiplier 628 to switches 1141 and 1144, the product from multiplier 629 to switches 1142 and 1145 and the product from multiplier 630 to switches 1143 and 1146.

If a signal emanates from switches 1137, 1138, 1139, 1140, 1141, 1142, 1143, 1144, 1145 or 1146, the work situation of FIGS. 37 and 39, 38, 35, 34 and 36, 37, 38, 39, 34, 35, 36 respectively exists.

A signal relating to the sense $53_S$ or $53_B$ from memories $253_S$ and $253_B$ respectively of the swing angle 53 is applied to switches 1137, 1138, 1141, 1142 and 1143 respectively 1139, 1140, 1144, 1145 and 1146, the output of which is connected to adder 818, subtractor 924, adder 819, subtractor 925, subtractor 928, adder 824, subtractor 929, subtractor 930, adder 825 respectively subtractor 931.

The output signal 47 of switches 2140 and 2141 of FIG. 71 is applied to subtractors 928, 929, 930 and 931 and to adders 824 and 825 (FIG. 72). The difference from subtractors 928, 929, 930 and 931 is passed to adder 827, subtractor 933, subtractor 934 and respectively, adder 829. The sum of adder 824 and the sum of adder 825 are passed to adder 828 and subtractor 935 respectively. The result $X''_{S36}$ or $X''_{S71}$ of FIGS. 34 to 42 from adder 827, adder 828 and subtractor 933 is passed to adder 830 (FIG. 73). The result $X''_{B36}$ or $X''_{B71}$ of FIGS. 34 to 42 from subtractors 934 and 935 and adder 829 is passed to adder 831. The result $Z_{36}=Z_{11a}$ or $Z_{71}=Z_{11b}$ from adders 818 and 819 and subtractors 924 and 925 is passed for correcting the gauging error $110_V$ or $110_A$ of FIG. 60 to adder 867. If the work is limited in the forward direction for example by a dam wall, a column or a similar obstacle, the Z co-ordinate of this obstacle is compared with the Z co-ordinate of the foremost point 142 (FIG. 3) of the cutting envelope 8, which in fact always forms part of the spherical part $9b$. In order to calculate $Z_{142}$ the signal $Z'_{69}$ from multiplier 604 of FIG. 69 is applied to a multiplier 645, in which the signal $Z'_{69}$ is multiplied by the signal cos(53) from cosine producer 509. The product $Z_{69}$ is applied to adder 822 for raising it with $Z_{36}$ and to switch 1150, which only at the reception of an instruction signal from sign producer 1206 of FIG. 69 passes the product $Z_{36}+Z_{69}$ to adder 823. The switch 1150 does not receive an instruction signal when the spherical part $9b$ is cutting. In this case switch 1151 receives an instruction signal from sign producer 1206 for passing the signal $Z_{71}$ to adder 823, in which the signal of spherical radius $10b$ is added to $Z_{71}$. The output signal from adder 823 is algebraically added in adder 866 to the correction values $-110_A$ or $110_V$ from memories 265 and 264 respectively to obtain $Z_{142}$.

According to FIG. 71 switches 1401 and 1404 supply an instruction signal to switch 1250 of FIG. 73, whereas the switches 1402 and 1403 supply an instruction signal to switch 1249.

Figure 6:
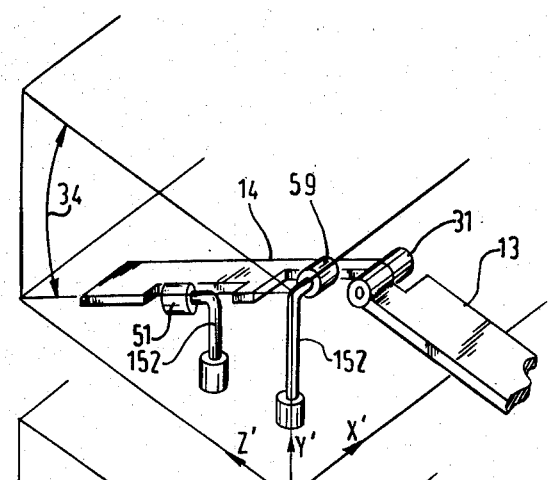
Figure 7:
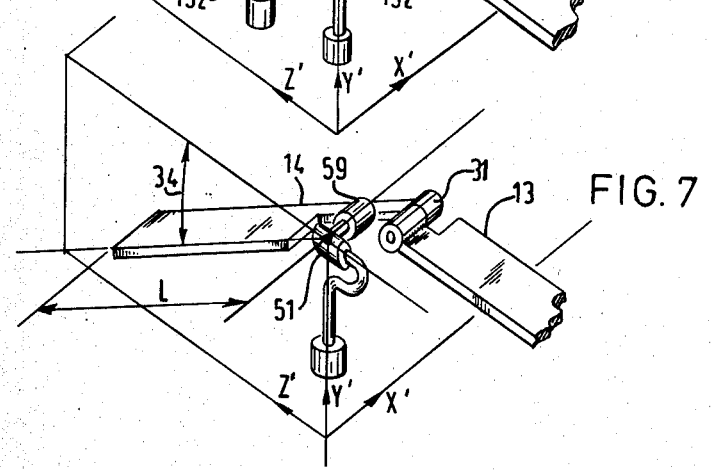
Figure 7A:
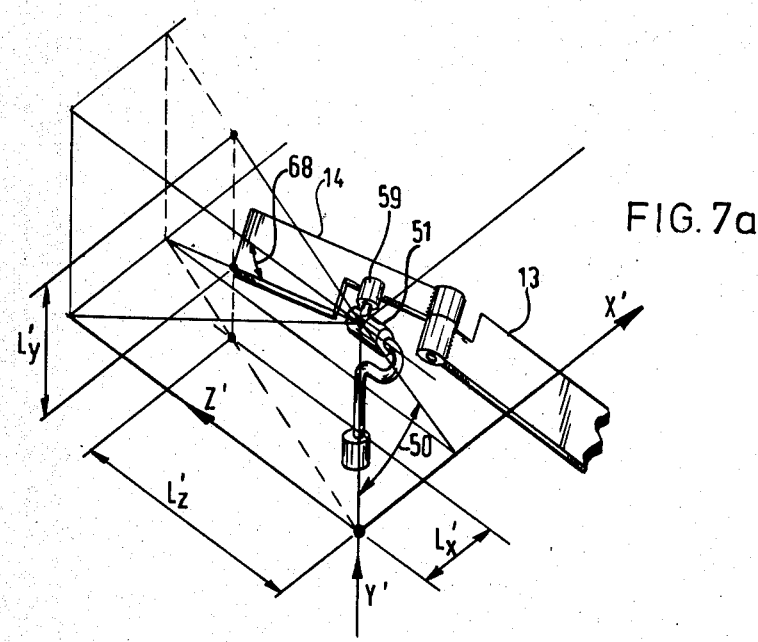
Figure 13A:
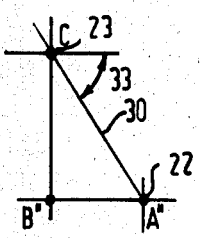
Figure 13B:
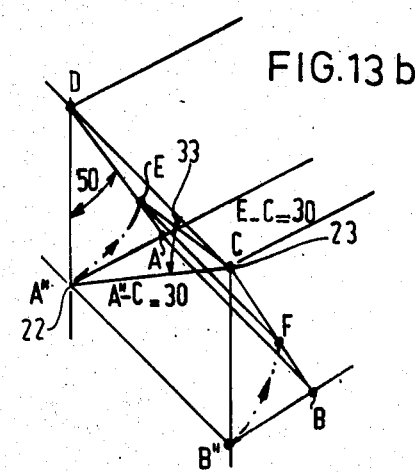
Figure 13C:
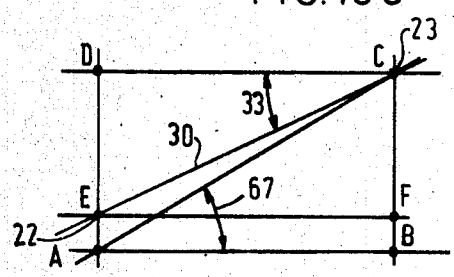
Figure 13D:
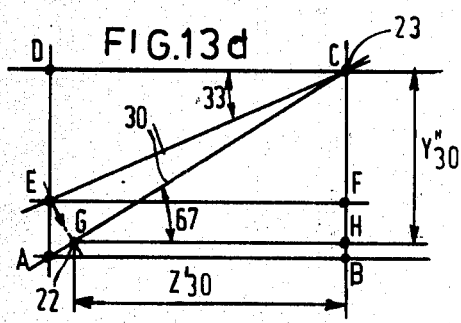
Figure 13E:
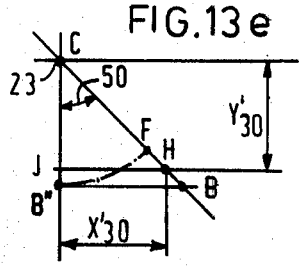
Figure 14A:
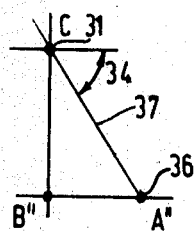
Figure 14B:
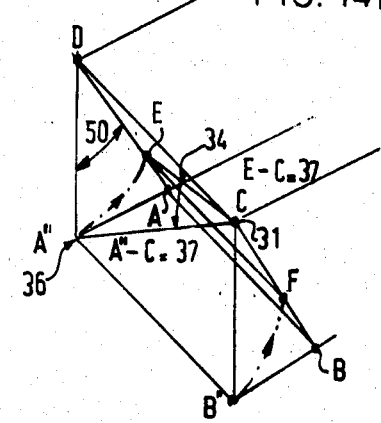
Figure 14C:
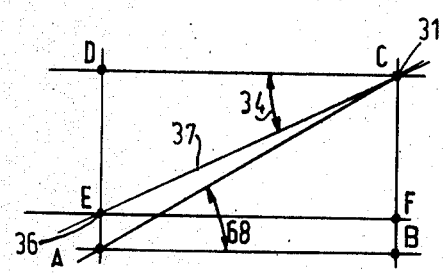
Figure 14D:
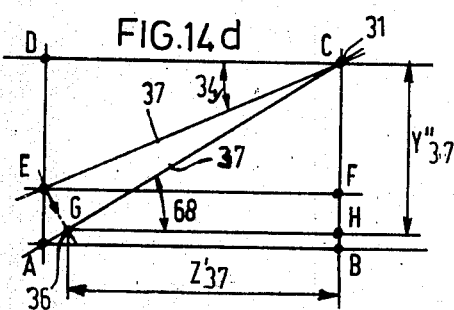
Figure 14E:
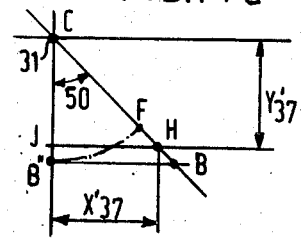
Figure 15A:
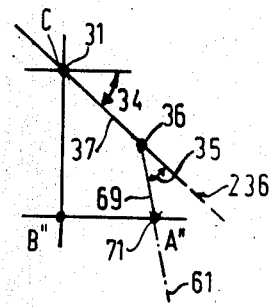
Figure 15B:
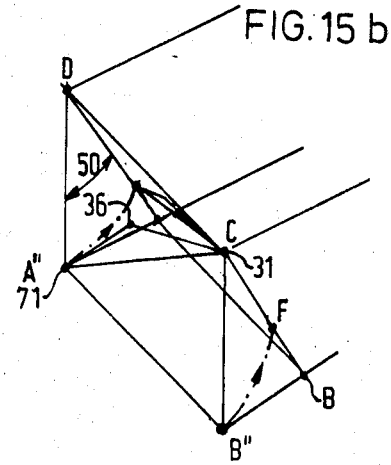
Figure 15C:
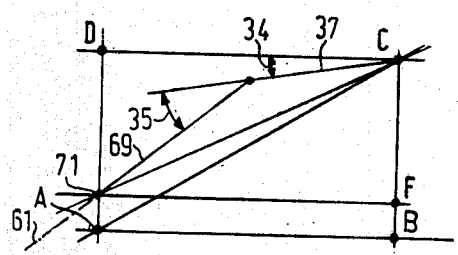
Figure 15D:
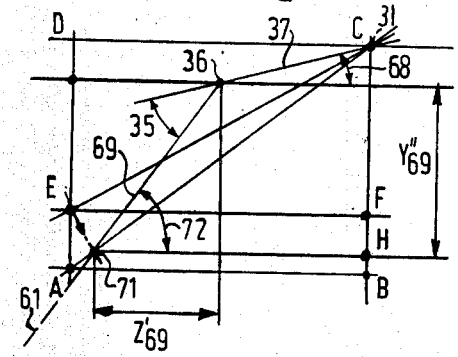
Figure 15E:
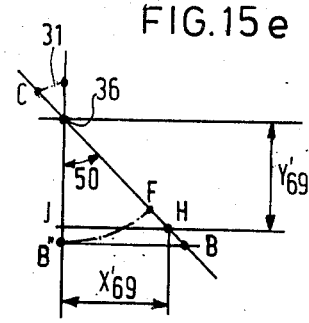
Figure 17A:
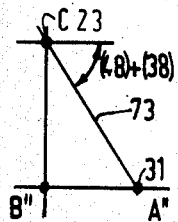
Figure 17B:
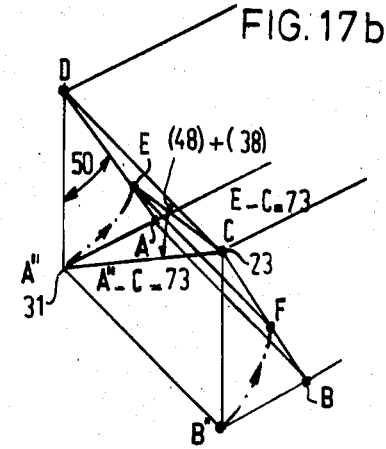
Figure 17C:
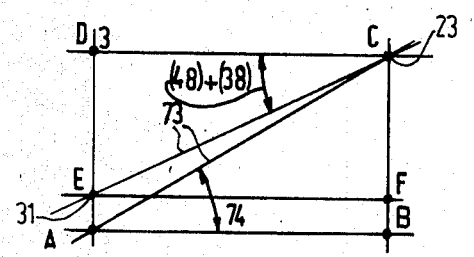
Figure 17D:
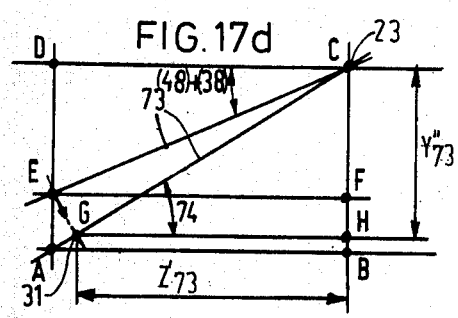
Figure 17E:
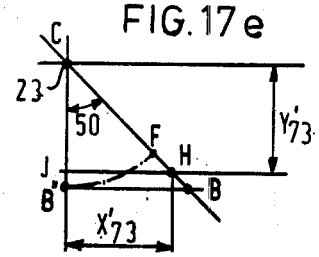
Figure 18A:
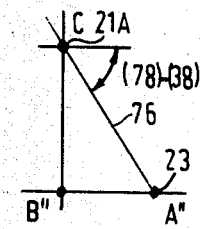
Figure 18B:
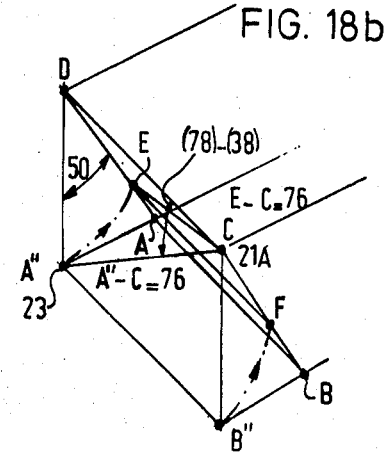
Figure 18C:
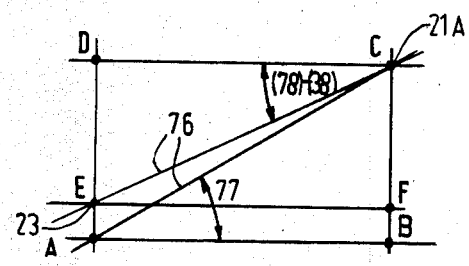
Figure 18D:
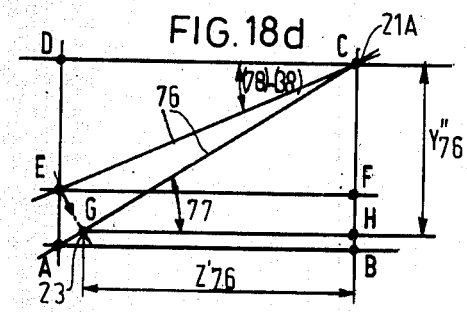
Figure 18E:
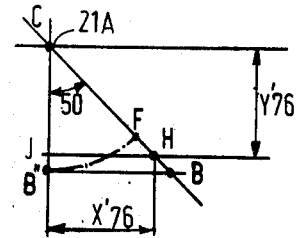
Figure 19A:
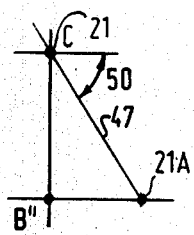
Figure 19B:
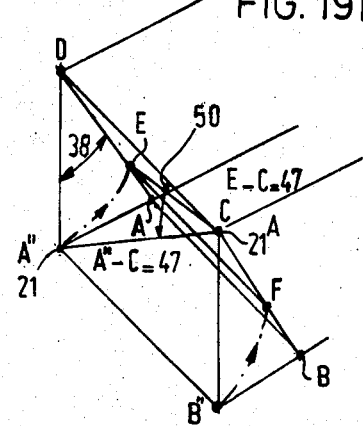
Figure 19C:
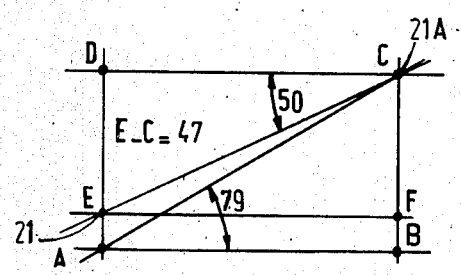
Figure 19D:
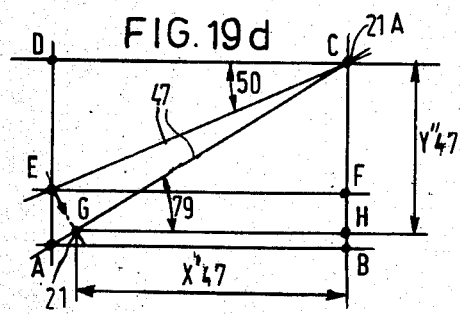
Figure 19E:
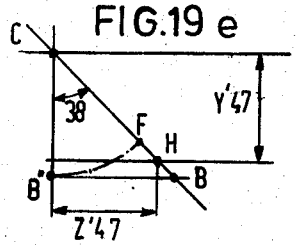

In order to calculate the projection angle 77 of FIGS. 3 and 18c in the circuit of FIG. 73 the pitch angle 38 is algebraically added in adder 860 to the signal of the fixed angle 78. The sum is converted in tangent producer 1399 into tan $((78)+(38))$, which output signal is applied as a numerator to divider 799, which receives as a denominator the signal cos (50) from cosine producer 501. The quotient tan (77) from divider 799 is applied to angle producer 1099, the output of which is connected to sine producer 412 and cosine producer 513. The output sin (77) together with the distance 76 from memory 276 is applied to multiplier 661. The product (76) sin (77) passes to adder 838, which also receives a signal $Y''_{30}$ from switches 2118 and 2116 of FIG. 71 from a memory 260. The sum $Y''_{30}+Y''_{76}$ from adder 838 is multiplied in multiplier 662 by the signal sin (50) from sine producer 401. The product $(Y''_{30}+Y''_{76})$ sin (50) is passed to adder 840 and subtractors 944 and 945. The signal cos (77) from cosine producer 513 passes to multiplier 663 for multiplication by signal 76 from memory 276. The product (76) cos (77)=$Z'_{76}$ is passed to adder 835, to which are also applied via memory 261 the signal $Z'_{23}$ from switches 2115 and 2117 of FIG. 71. The sum is applied to adder 839 and subtractor 943. The signal 47 from switches 2140 and 2141 of FIG. 71 is passed to memory 247 and from there to multipliers 664 and 665, adder 836 and subtractors 939 and 940.

The signal sin (38) of sine producer 410 is passed to multiplier 666 and the signal cos(38) from cosine producer 511 is applied as a denominator to divider 712, which receives as a numerator the signal tan(50) from tangent producer 1398. The quotient tan(79) of divider 712 is converted in angle producer 1007 into angle 79, which is passed to sine producer 411 and cosine producer 512. The signal sin(79) is applied to multiplier 666, the product sin(38)×sin(79) of which is fed to multiplier 665, the product (47)sin(38)×sin(79)=$Z'_{47}$ is fed to subtractor 943 and adder 839.

For calculating the distance 105 (FIGS. 53 to 59) the following part of the circuit of FIGS. 71 and 73 is used. The output signals from switches 1401 and 1404 indicate that one of the situations $18_B$ with $50_S$ or $18_S$ with $50_S$ occurs and therefore pass to signal producer 1250. The output signals from switches 1402 and 1403 indicate that one of the situations $18_S$ with $50_B$ or $18_B$ with $50_B$ occurs and are, therefore, applied to signal producer 1249.

The output $(107)=X'_{47}+(X'_{76}+X'_{30})$ of adder 840 (for the work situations of FIGS. 58 and 59) is passed via switch 1228 to subtractor 940. The output $(107)=(X'_{76}+X'_{30})-X'_{47}$ of subtractor 945 is passed through switch 1227 to a sign scanner 1259, which for the work situations of FIGS. 56 and 57 passes a positive result to adder 836. The output $(107)=X'_{47}-(X'_{76}+X'_{30})$ of subtractor 944 passes through switch 1226 to the sign scanner 1259, which passes a positive result for the work situations of FIGS. 56 and 57 to subtractor 939. In subtractor 940 the signal 47 from memory 247 is reduced by the signal 107. In adder 836 the signal 47 from memory 247 is augmented by signal 107 and in subtractor 939 the signal 107 is reduced by signal 47. The results 105 are fed to the sign producers 1255 and 1256.

If signal producer 1250 receives a signal, it passes the same to sign converter 1254, which passes it as a negative signal to sign producer 1256, which feeds its output signal $-105$ to adder 831. Signal producer 1250 feeds, in addition, a signal to sign converter 1253, which transmits the same as a positive signal to sign producer 1255, which feeds its output signal $+105$ to adder 830.

Figure 66:
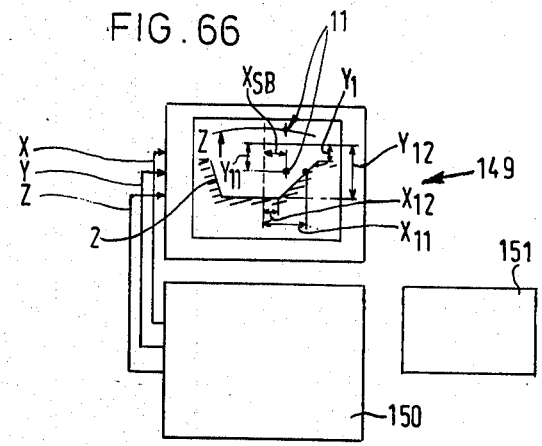

If signal producer 1249 receives a signal, it passes the same to sign converter 1254, which passes it as a positive signal to sign producer 1256, whose output signal $+105$ is applied to adder 831. Signal producer 1249 applies, in addition, a signal to sign converter 1253, which feeds it as a negative signal to sign producer 1255, which applies its output signal $-105$ to adder 830. The algebraic sum of adder 831 is raised in adder 862 by $X_{10a}$ or $X_{10b}$ (see FIG. 24c). The sum $X''_{B71}+X_{10a}$ or $X_{B36}+X_{10b}$ is raised algebraically in adder 864 by the deviation $108_B$ or $108_S$ from memories 263 or 262 respectively (see FIG. 60). The deviations $108_B$ and $108_S$ have forced upon them a $+$sign and a $-$sign respectively by sign converter 1248 with sign producers 1251 and 1252 or by sign converter 1247 with sign producers 1251 and 1252, after which the deviations $108_B$ and $108_S$ provided with a sign are passed to adders 864 and 865 respectively. The sign of the sum of adders 864 and 865 is scanned in a sign scanner 1258 and 1257 respectively and in the case of a negative scan it is passed to memory $211_B$ or $211_S$ respectively and in the case of a positive scan it is passed to memory $211_S$ or $211_B$ respectively included in the arithmetic device 150 (FIG. 66). The memory $211_S$ comprises the co-ordinate $X_{S11a}$ or $X_{S11b}$, whereas the memory $211_B$ comprises the co-ordinate $X_{B11a}$ or $X_{B11b}$.

For calculating $Z_{21}$ relating to the aerial 21 the outputs of adder 839 and subtractor 943 are connected through switches 1155 and 1154 respectively to adder 861.

The memory 266 for the pitch angle $-38$ actuates the switches 1230 and 1231. The memory 267 relating to the pitch angle $+38$ actuates switches 1232 and 1229. If one of the switches 1229, 1230, 1231 and 1232 receives two signals, it passes a signal to one of the switches 1155 and 1154 as follows: the switches 1232 and 1230 to switch 1155 and the switches 1229 and 1231 to switch 1154. That one of the switches 1154 and 1155 which receives two signals passes the signal from subtractor 943 or adder 839 to adder 861, which also receives the correction signal $110_V$ or $-110_A$ (see FIG. 60) from memories 264 and 265 respectively.

The output signal $Z'_{21}$ of adder 861 is multiplied in multiplier 667 by the signal cos (53) from cosine producer 509 in order to obtain $Z_{21}$, which is introduced into memory $221_Z$ of the arithmetic device 150.

The outputs X, Y and Z of the arithmetic unit 150 are supplied to a display 149 (FIG. 66) formed by a screen showing the work 2 and the instantaneous place 5 of the point of intersection 11, which is first to touch the surface of the work 2 during the movement made by the cutting head suction dredger 1 in order to be able to assess how long this movement can be continued. Instructions may be introduced into a control-panel 151 with the aid of the display 149 for actuating parts of the cutting head suction dredger 1.

Figure 76:
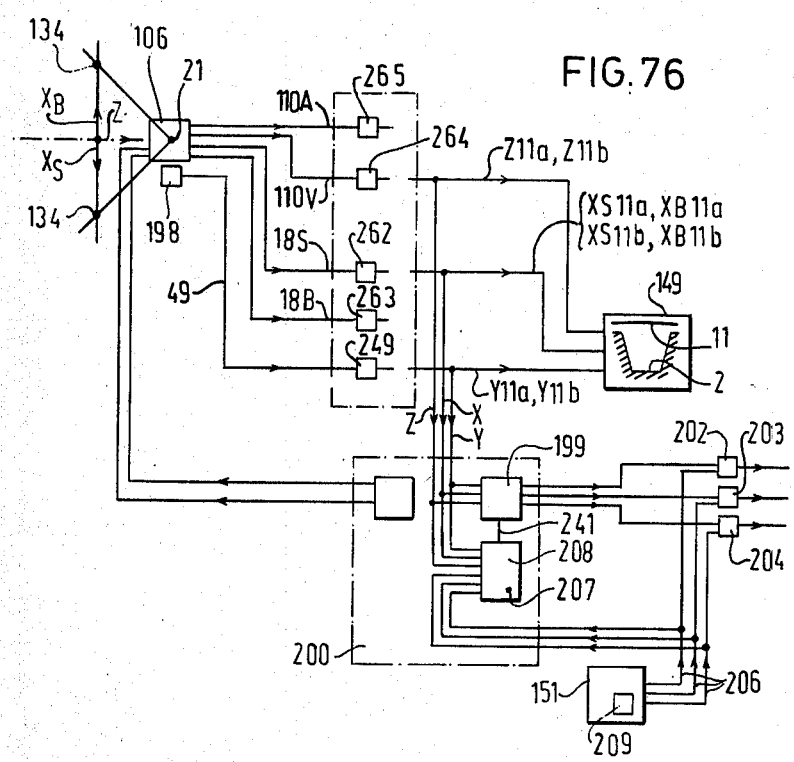
Figure 77:
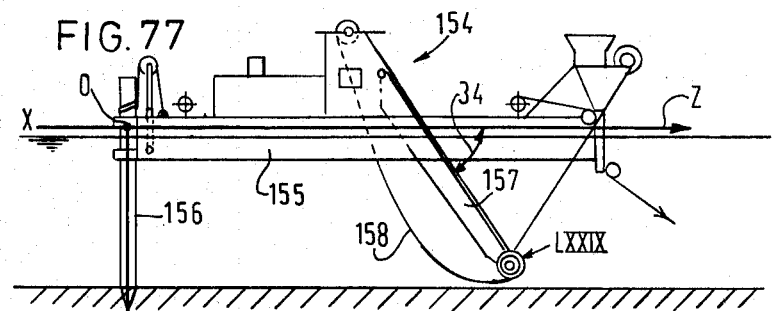
Figure 78:
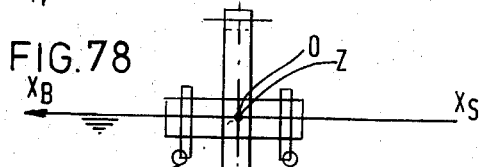
Figure 79:
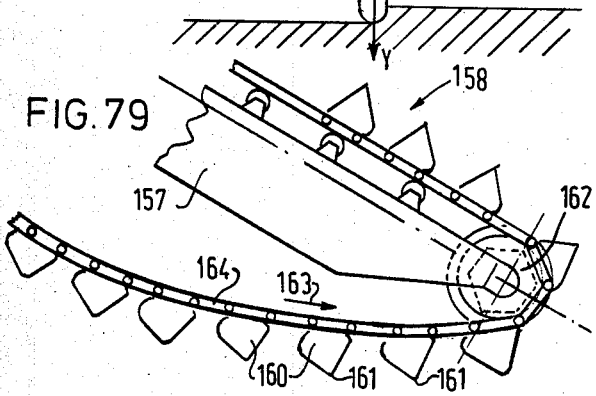
Figure 80:
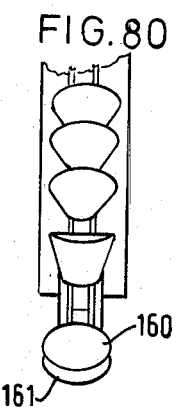
Figure 81:
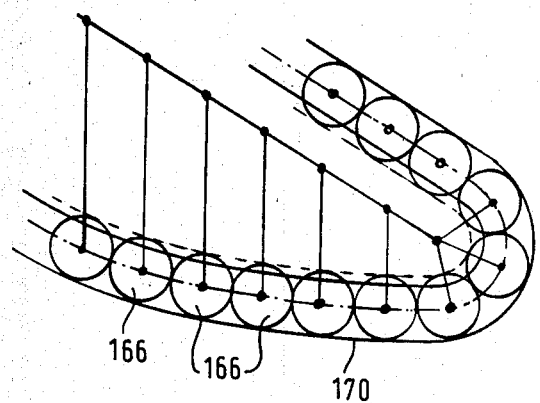
Figure 82:
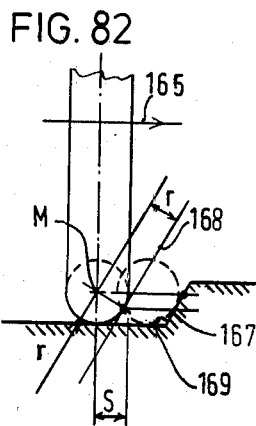

The cutting head 6 of the cutting head suction dredger 1 is preferably steered in accordance with the further developed scheme of FIG. 76. The gauging apparatus 106 comprising the beacons 134 and the aerial 21 provides the correction values $110_A$ or $110_V$ and $108_B$ or $108_S$ of the aerial 21 in the work co-ordinate system (FIG. 60) and passes said correction values to memories 265, 264, 263 and 262 respectively. The tide difference 49 of the tide difference pick-up 198 is applied to memory 249. As is fully described hereinbefore the arithmetic device 150 does not only pass the co-ordinates X, Y and Z of the point of intersection 11 to the display 149, but passes them also to a comparator 199 of the arithmetic device 200, in which comparator 199 the circumscriptions of the work 2 are introduced as co-ordinates. The comparator 199 compares for instance when maintaining a certain Y co-ordinate the instantaneous X co-ordinate with a X co-ordinate of the talus 84 to be approached. At a certain distance 201 (FIG. 50) from the point of intersection 11 unto the talus 84, that is to say at a predetermined $X_{S11}$ in combination with $Y_{S11}$ instructions are passed to a control member 203 of side winches for reducing the swing speed and afterwards when reaching the talus 84 instructions are passed for having the swing stopped. Furthermore an instruction signal is passed then to a control member 202 of the ladder winch 17 in order to have the cutting head 6 brought downwards and at the same time in dependence upon said downward movement an instruction signal is passed for moving the cutting head 6 back into the direction $X_B$. In this manner the path of movement of the cutting head 6 is followed according to the arrows of FIG. 50. In an analogue way the cutting head 6 is steered in Z direction in consecutive steps according to parallel peels and without repeatedly cutting one and the same place by means of a control member 204 for controlling the cylinders 205 of the anchoring piles 18.

Figure 49:
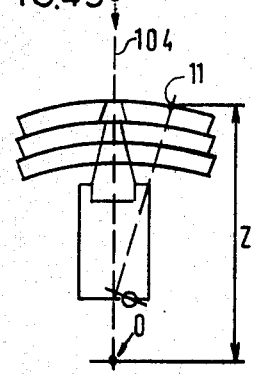
Figure 50:
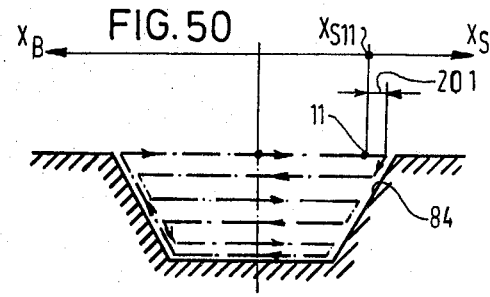
Figure 51B:
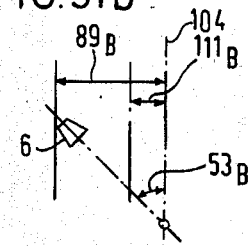
Figure 51A:
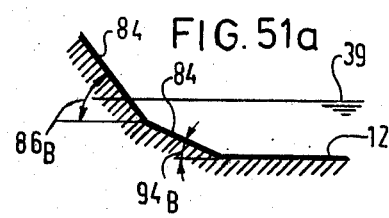

In a further developed method according to the invention the cutting head 6 is manually steered along the path of FIGS. 49 and 50 through a displacement speed which is manually set on the control-panel 151, while also the suspension convey method is manually set on the control-panel 151. The steering signals 206 are moreover introduced into a program memory 207 of the arithmetic device 200 while said steering signals 206 are coupled in said memory 207 to the instantaneous co-ordinates of the point of intersection 11 and the time of a dredging cycle from a time clock 208. Afterwards the cutting head suction dredger 1 is transferred to an automatic steering mode by means of a switch 209 on the control-panel 151 of the manual steering, in which mode the cutting head 6 is passed along corresponding paths and the cutting head 6 is steered in accord with the dredging program previously stored in the program memory 207. To this aim the program memory 207 passes signals 241 through the comparer 199 to control members, such as the members 202, 203 and 204.

The dredger implement 154 of FIGS. 77 to 82 comprises a floating body 155, anchoring means formed by an anchoring pile 156, a ladder 157 movably connected with the floating body 155 and a cutting member 158. The cutting member 158 consists of a series of scoops 160 having cutting edges 161 guided around a hexagon 162 and arranged on a chain 164 driven in the direction of the arrow 163. The position of the cutting member 158 with respect to a work co-ordinate system XYZ is controlled by measuring, calculating and controlling means as described with reference to the cutting head suction dredger 1 of FIGS. 1 to 76. During a given movement of the cutting member 158 in the direction of the arrow 165 the tangential point 167 of each of a series of cutting envelopes 166 of the cutting member 158 to a plane parallel to the prescribed profile 169 to be encountered is determined. The radius r of the cutting envelope directed to the tangential point 167 is projected onto the co-ordinates X, Y and Z and in particular onto the X co-ordinate, onto which is projected the path S to be covered by the centre M. In the calculation of the path S still to be covered by the centre M the projection of said radius r is taken into account. With the great number of cutting envelopes the path to be covered by the cutting member 158 is limited by that cutting envelope 166 which is first to come into contact with the prescribed profile 169. Since the shape of the chain line depends upon the angle of inclination 34 of the ladder 157, the location of the centres M of the cutting envelopes 166 in dependence upon said angle of inclination 34 is introduced into the calculation program.

The suction transport process is obtained by means of a suction pipe 290 (FIG. 2) connected to the ladder 14 and communicating through a flexible tube 291 with a pump 292 having a pressure line 293. This suction transport process is automatically controlled e.g. by adjusting the number of revolutions of the pump and/or by adjusting the specific weight of the suspension. To this aim a valve 300 can be opened for adding water into the suction pipe 290 for adjusting the mixture of soil loosened by the cutting member 6 and sucked in through the suction mouth 295 of the suction pipe 290. In order to control the suction transport process there are provided a pressure gauge 296 at the inlet side of the pump 292 and a pressure gauge 297 at the outlet side of the pump 292, a pick up 298 for measuring the specific weight of the suspension at the suction pipe and a flow meter 299.

What I claim is:

1. The method of dredging accurately to a desired profile contour by means of a cutting dredger which comprises the steps of:
   (a) driving a cutting tool whereby cutting elements of the tool describe a cutting envelope;
   (b) swinging said cutting tool while a portion of said cutting envelope is engaged with subaqueous material so that the cutting envelope sweeps along a path leading to a desired profile contour; and
   (c) monitoring the location of said cutting envelope relative to said contour and terminating said swinging when that point on said portion which will first contact said contour has been determined to be substantially at said contour.

2. The method of dredging as defined in claim 1 wherein said cutting tool is carried by a link element at one end of a serial system of pivotally interconnected links, the termination of step (c) being determined by measuring, during the swinging of step (b), angular movements of each link within two orthogonal planes passing through that pivotal connection of each link which is remote from said cutting tool.

3. The method of dredging which comprises the steps of:
   (a) providing a cutting tool on one end of a link element which is at one end of a serial system of pivotally interconnected links,
   (b) swinging said system of links to sweep said cutting tool along a path;
   (c) measuring angular movements of each link within two orthogonal planes passing through that pivotal connection of each link which is remote from said cutting tool; and
   (d) controlling said tool in response to the measurements of step (c).

4. The method as defined in claim 3 wherein the controlling of step (d) comprises storing the values of the angular movements measured in step (c) for discrete locations along said path and guiding the cutting tool from such stored values during a subsequent sweep of the cutting tool.

5. The method as defined in claim 3 or 4 wherein the controlling of step (d) comprises terminating the end points of the sweeping motion of step (b) so that the sides and bottom of a channel cut by successive sweeps of the tool closely conform to a desired profile.

6. The method as defined in claim 5 including the step of simulating the cutting envelope of the cutting tool as a series of imaginary spheres and calculating the extremes of sidewise and bottomwise cutting based upon such simulation.

7. The method of dredging which comprises the steps of:
   (a) orienting a buoyant cutter dredger hull by means of radio beacons such that the centerline of the hull is substantially located within a vertical plane which defines the Y,Z plane of an X, Y, Z coordinate system with respect to which the depth coordinates Y and side slope coordinates X of a desired profile for a channel are known,
   (b) anchoring the hull to define a pivot point whose location is fixed with respect to said Y,Z plane while the hull is oriented as in step (a) and swinging the cutter of the cutter dredger downwardly into engagement with subaqueous ground;
   (c) swinging said dredger about said pivot point thereby to swing the cutter in known manner with relation to X, Y, Z coordinate system;
   (d) mathematically simulating the cutting envelope of said cutter as at least one imaginary sphere of fixed radius; and
   (e) controlling the sideways translation of said cutter to cause the simulated cutting envelope to move into close conformity with said known side slope coordinates of the desired profile for a channel without exceeding the X coordinates thereof.

* * * * *